US009269383B1

(12) United States Patent
Hattori et al.

(10) Patent No.: US 9,269,383 B1
(45) Date of Patent: Feb. 23, 2016

(54) MULTI-SENSOR (MIMO) HEAD HAVING A BACK SIDE ANTIFERROMAGNETIC MIDDLE SHIELD

(71) Applicant: HGST Netherlands B.V., Amsterdam (NL)

(72) Inventors: Masashi Hattori, Odawara (JP); Kouichi Nishioka, Hiratsuka (JP); Takashi Wagatsuma, Odawara (JP); Nobuo Yoshida, Hiratsuka (JP); Kenichi Meguro, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/604,630

(22) Filed: Jan. 23, 2015

(51) Int. Cl.
 *G11B 5/39* (2006.01)
(52) U.S. Cl.
 CPC ............ *G11B 5/3932* (2013.01); *G11B 5/3912* (2013.01)
(58) Field of Classification Search
 CPC ............. G11B 2005/3996; G11B 5/29; G11B 5/3932; G11B 5/3133; G11B 5/3912; G11B 5/3977; G11B 5/398; G11B 5/397; G11B 5/11; G11B 5/115
 USPC ................................. 360/319, 314, 315, 316
 See application file for complete search history.

(56) References Cited

U.S. PATENT DOCUMENTS

| 5,825,181 | A | 10/1998 | Schaenzer et al. |
| 6,157,510 | A | 12/2000 | Schreck et al. |
| 7,220,499 | B2* | 5/2007 | Saito et al. ................ 428/811.5 |
| 7,327,539 | B2* | 2/2008 | Saito .......................... 360/324.1 |
| 7,502,193 | B2 | 3/2009 | Albrecht et al. |
| 7,599,155 | B2* | 10/2009 | Saito et al. ............... 360/324.11 |
| 7,616,411 | B2* | 11/2009 | Gill .......................... 360/324.12 |
| 8,139,301 | B1 | 3/2012 | Li et al. |
| 8,508,880 | B2 | 8/2013 | Gao et al. |
| 8,582,249 | B2* | 11/2013 | Sapozhnikov et al. .. 360/324.11 |
| 8,675,318 | B1* | 3/2014 | Ho et al. .................. 360/324.11 |
| 8,711,528 | B1* | 4/2014 | Xiao et al. ............... 360/324.11 |
| 9,042,062 | B2* | 5/2015 | Hong et al. .............. 360/324.11 |
| 9,047,893 | B1* | 6/2015 | Gao et al. |
| 2005/0270703 | A1* | 12/2005 | Hayakawa et al. ........ 360/324.1 |
| 2006/0028772 | A1* | 2/2006 | Raastad ....................... 360/315 |
| 2007/0146939 | A1* | 6/2007 | Pinarbasi ................. 360/324.11 |
| 2010/0020435 | A1 | 1/2010 | Chen et al. |
| 2010/0232072 | A1* | 9/2010 | Dimitrov et al. ............. 360/319 |
| 2012/0134057 | A1* | 5/2012 | Song et al. ................... 360/319 |
| 2012/0276415 | A1* | 11/2012 | Sapozhnikov et al. ....... 428/831 |
| 2013/0250447 | A1 | 9/2013 | Erden |
| 2014/0293473 | A1* | 10/2014 | Kawasaki et al. .............. 360/75 |
| 2014/0340793 | A1* | 11/2014 | Song et al. .................... 360/319 |

(Continued)

*Primary Examiner* — Will J Klimowicz
(74) *Attorney, Agent, or Firm* — Zilka-Kotab, PC

(57) ABSTRACT

According to one embodiment, a magnetic head includes a lower magnetic shield positioned at a media facing surface of the head, a lower sensor positioned above the lower magnetic shield, the lower sensor including a lower free layer, a middle magnetic shield positioned above the lower sensor at the media facing surface of the head, and a back side antiferromagnetic (AFM) layer positioned behind the lower free layer in an element height direction, the back side AFM layer being configured to provide magnetic stabilization for the middle magnetic shield. In another embodiment, a method includes forming a lower sensor including a lower free layer, forming a back side AFM layer behind the lower free layer in an element height direction, and forming a middle magnetic shield above the lower sensor, wherein the back side AFM layer is configured to provide magnetic stabilization for the middle magnetic shield.

20 Claims, 25 Drawing Sheets

(56) References Cited

U.S. PATENT DOCUMENTS

| | | | |
|---|---|---|---|
| 2015/0036246 A1* | 2/2015 | McNeill et al. | 360/319 |
| 2015/0062735 A1* | 3/2015 | Sapozhnikov et al. | 360/46 |
| 2015/0062755 A1* | 3/2015 | Sapozhnikov et al. | 360/235.4 |
| 2015/0179195 A1* | 6/2015 | Freitag et al. | |

* cited by examiner

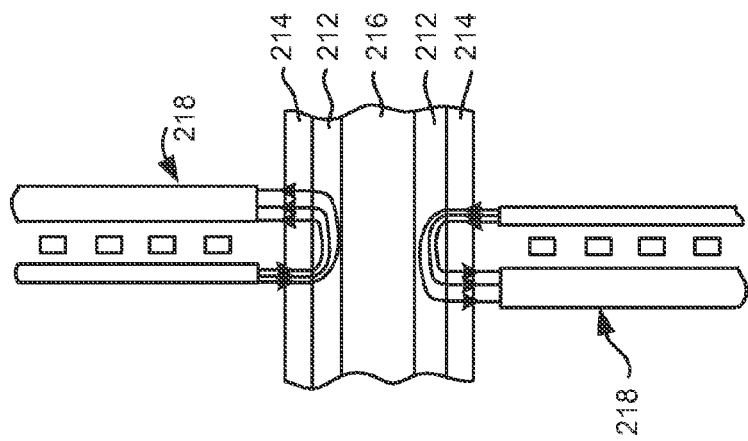
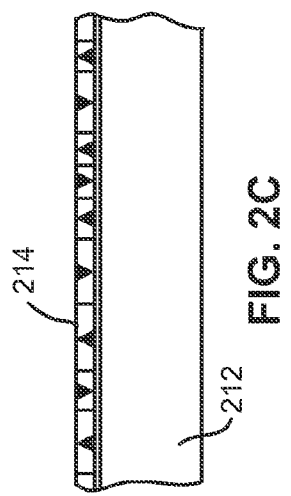
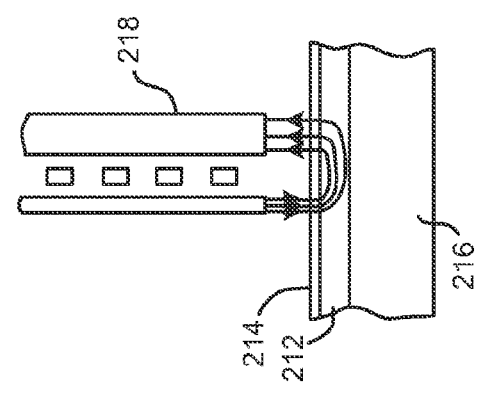
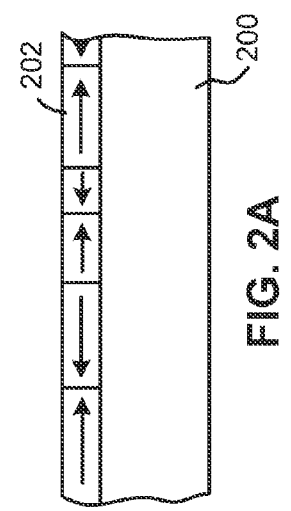
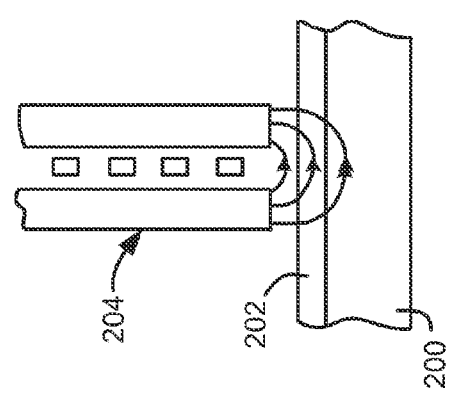

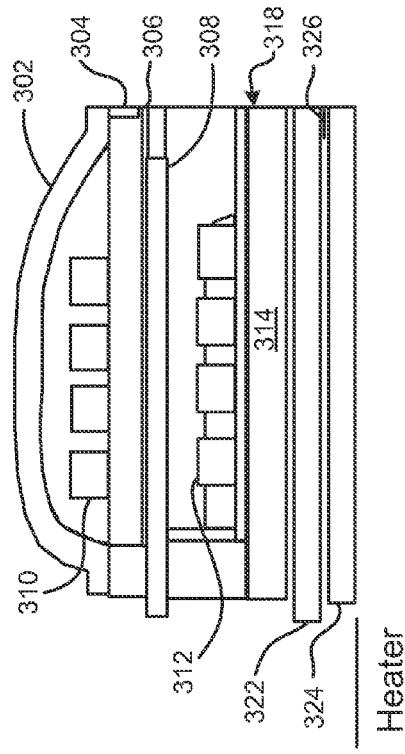
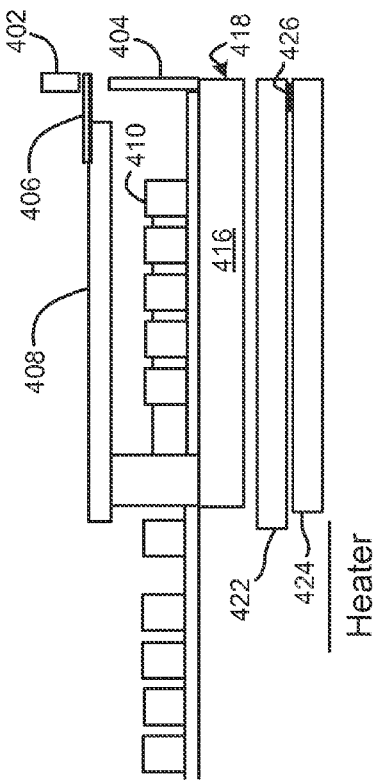
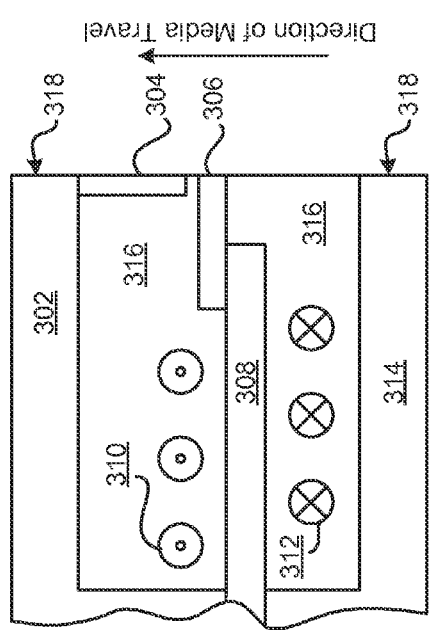
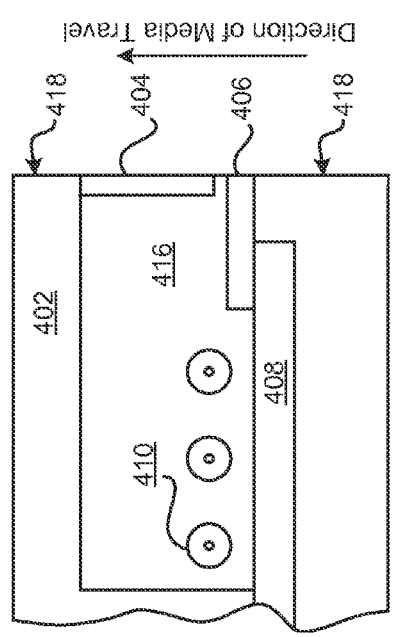

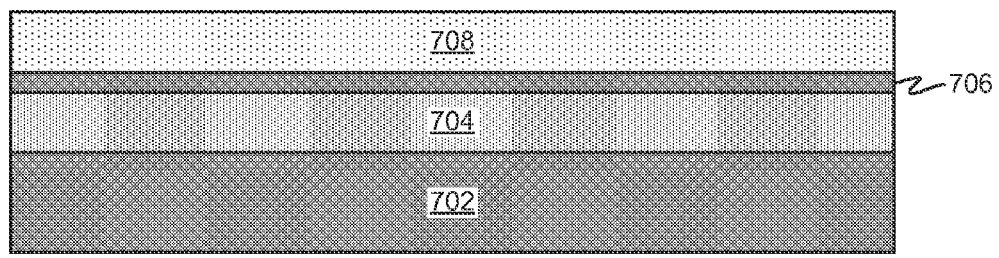
Media-Facing Surface View
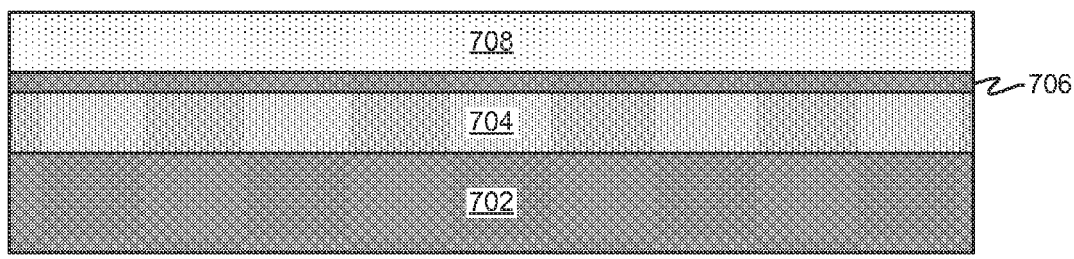
Cross-Sectional View
FIG. 8A

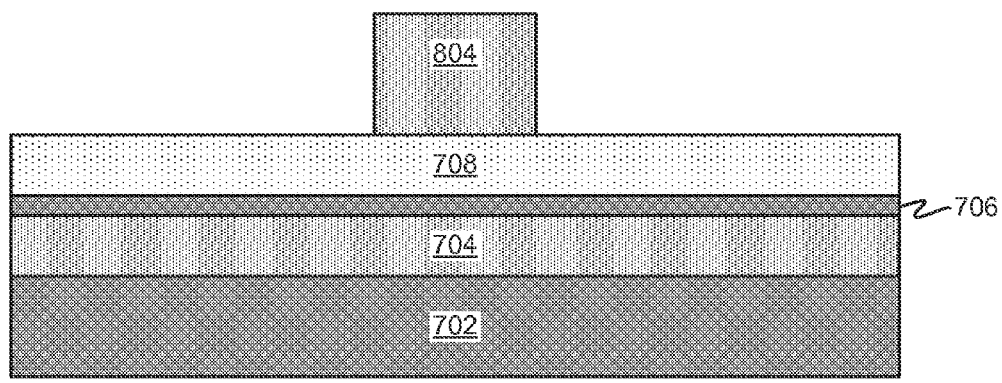
Media-Facing Surface View
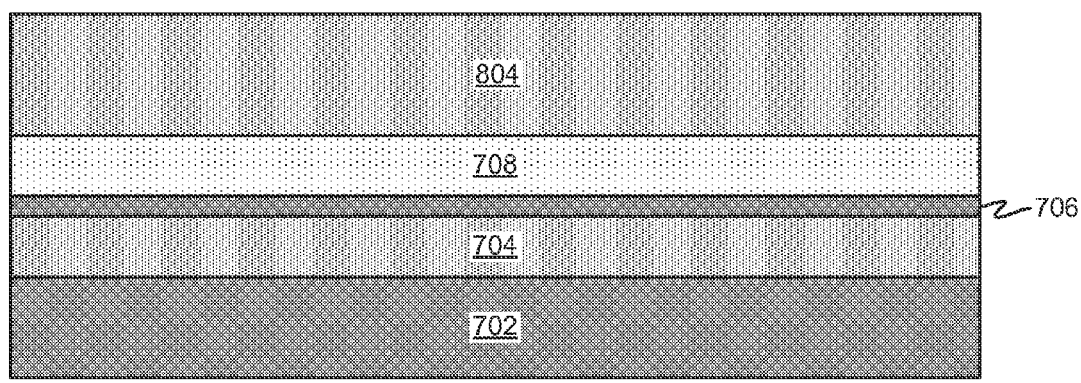
Cross-Sectional View
FIG. 8B

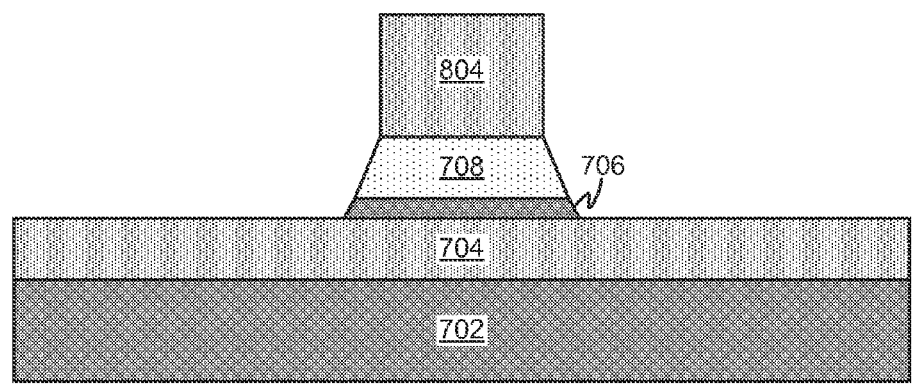
Media-Facing Surface View
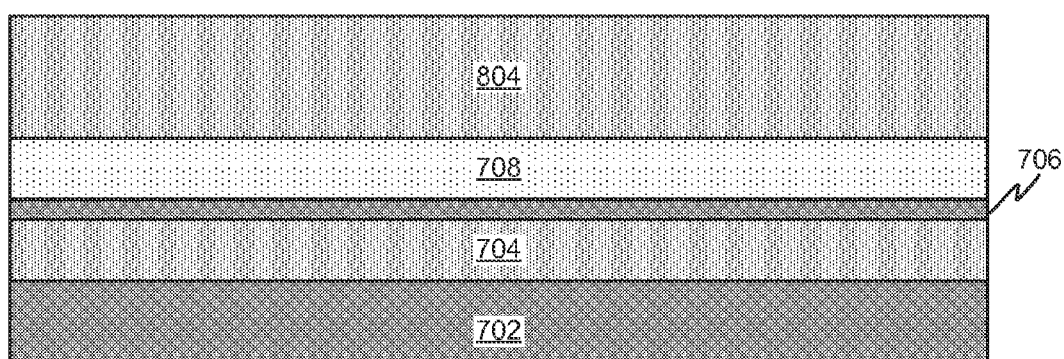
Cross-Sectional View
FIG. 8C

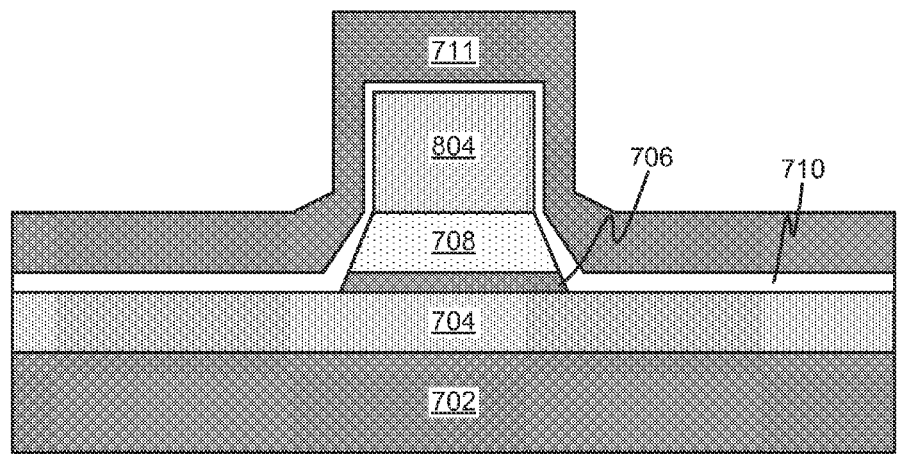
Media-Facing Surface View
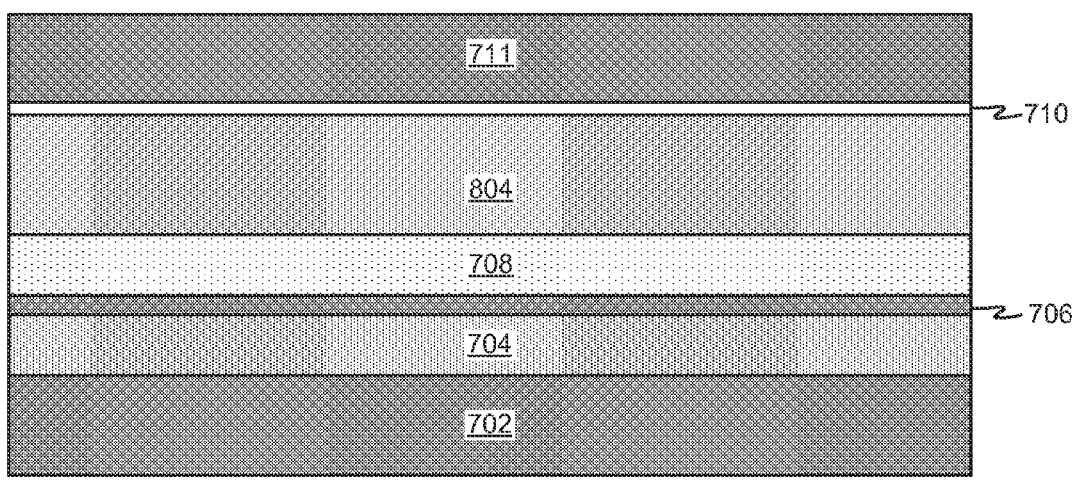
Cross-Sectional View
FIG. 8D

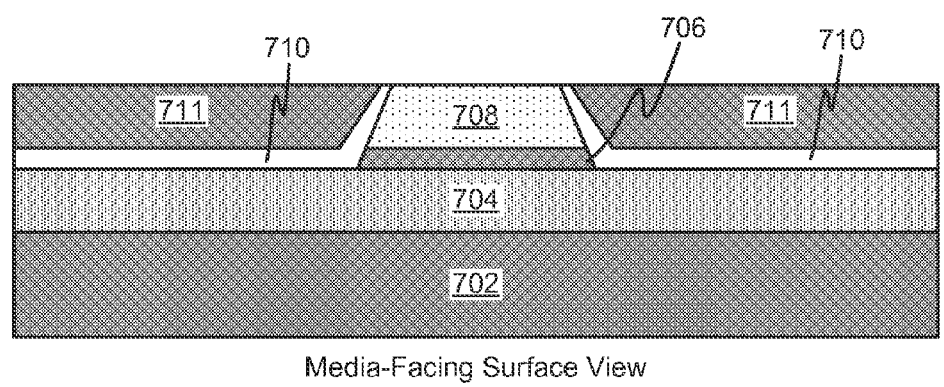
Media-Facing Surface View
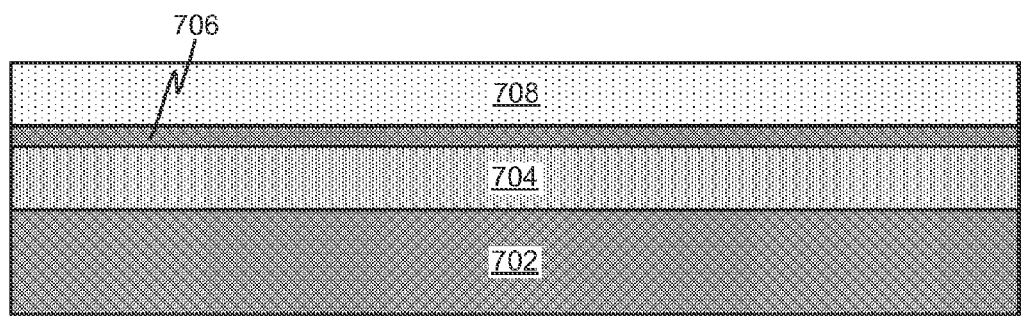
Cross-Sectional View
FIG. 8E

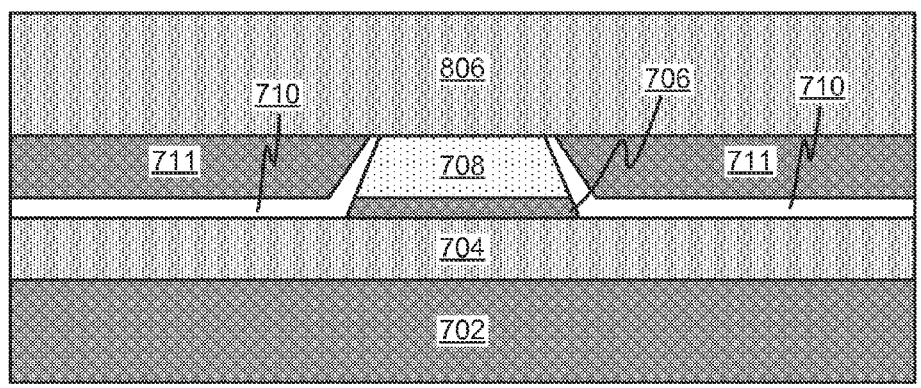
Media-Facing Surface View
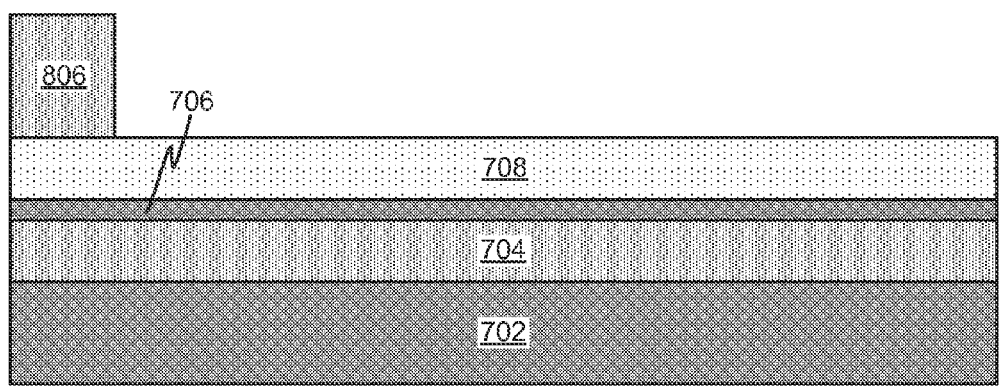
Cross-Sectional View
FIG. 8F

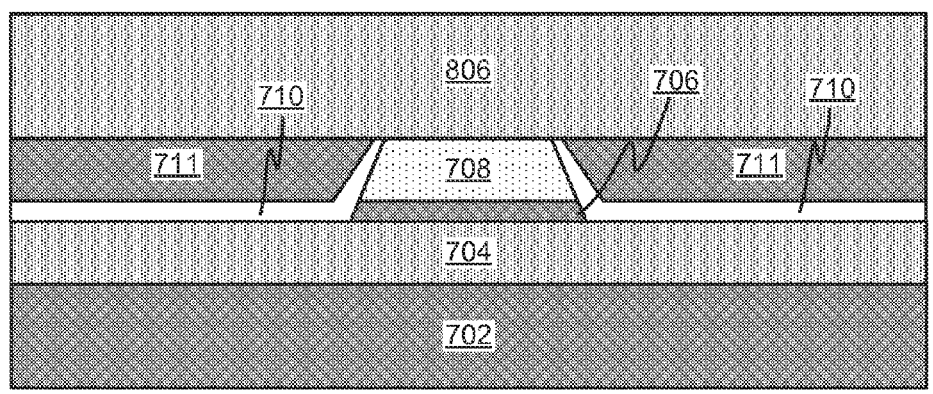
Media-Facing Surface View
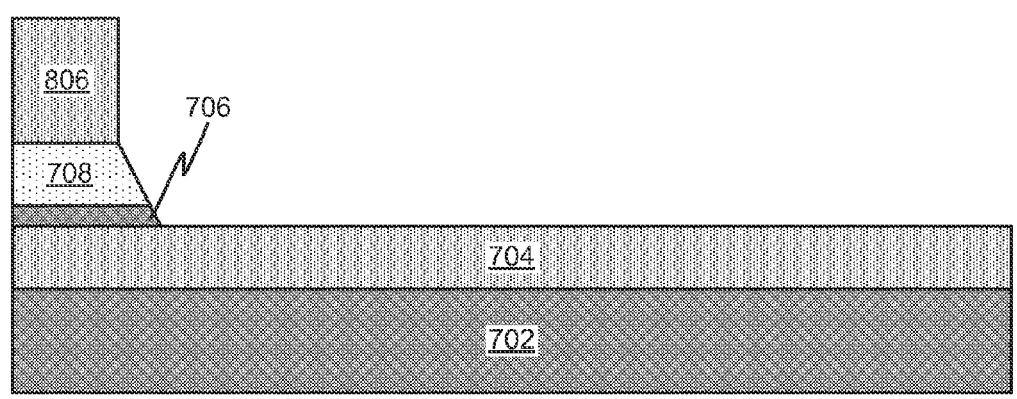
Cross-Sectional View
FIG. 8G

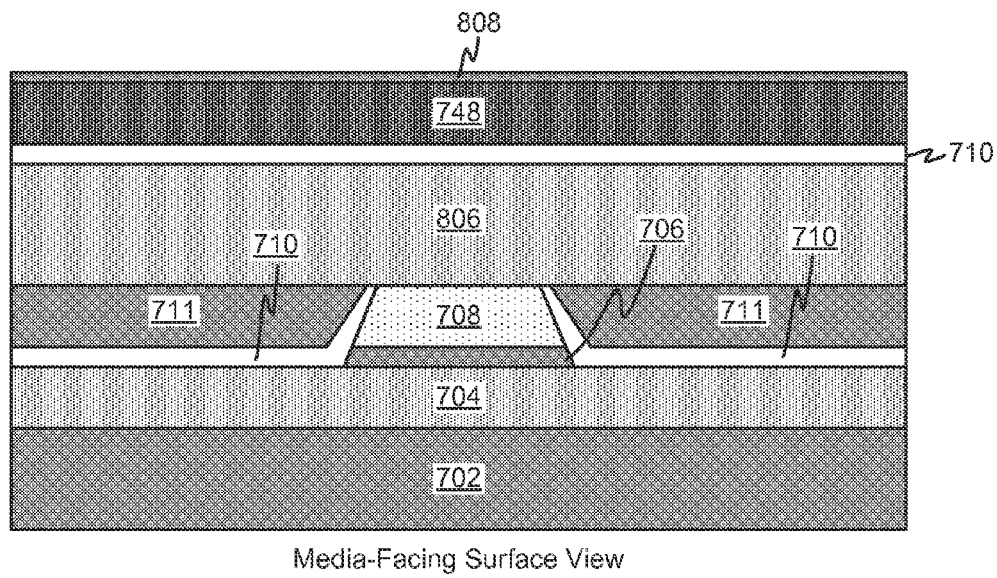
Media-Facing Surface View
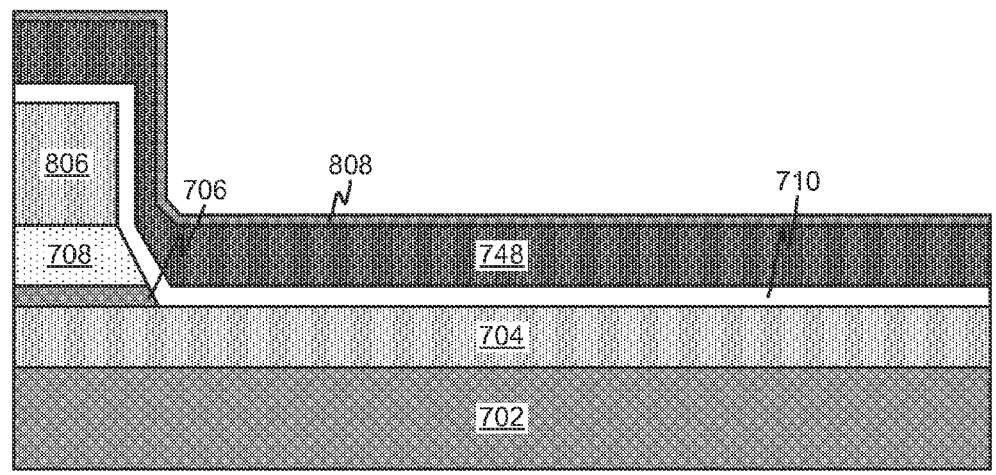
Cross-Sectional View
FIG. 8H

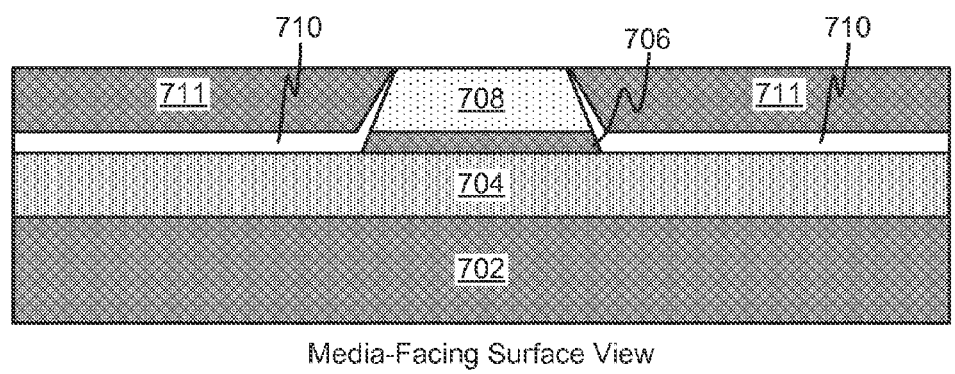
Media-Facing Surface View
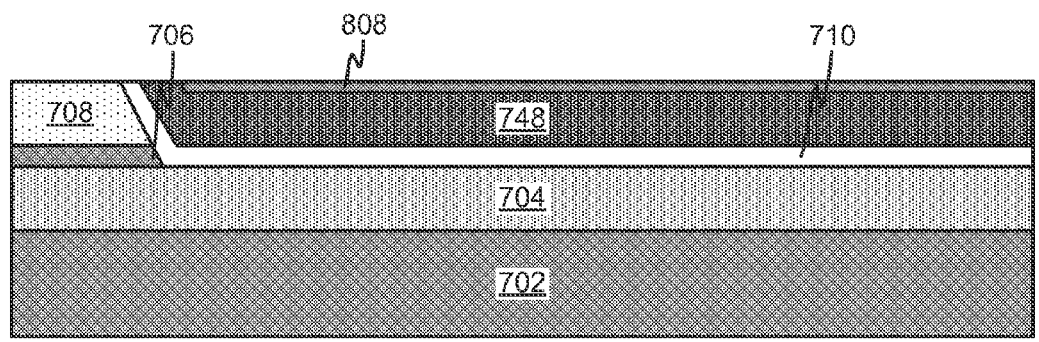
Cross-Sectional View
FIG. 8I

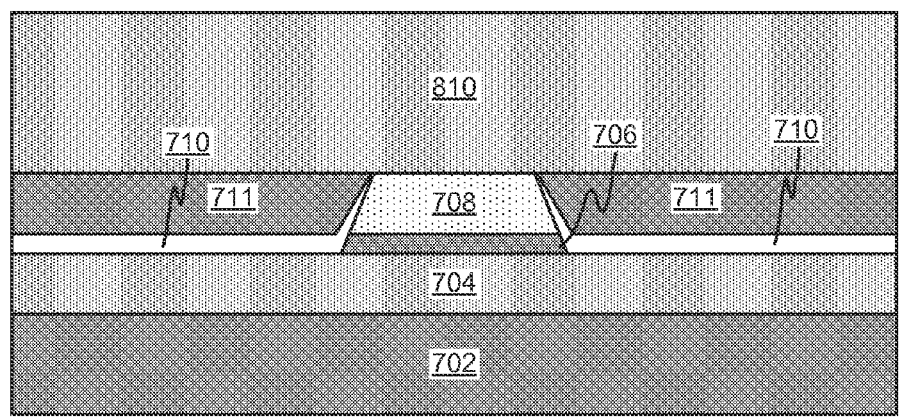
Media-Facing Surface View
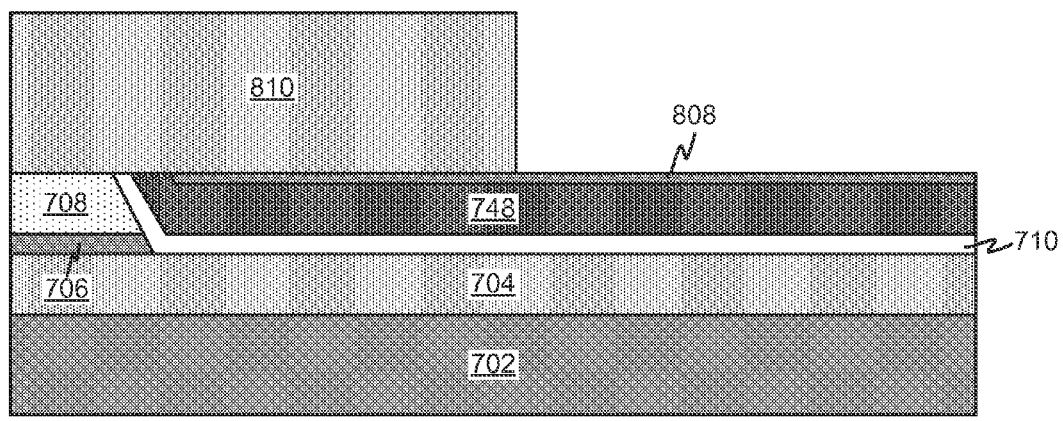
Cross-Sectional View
FIG. 8J

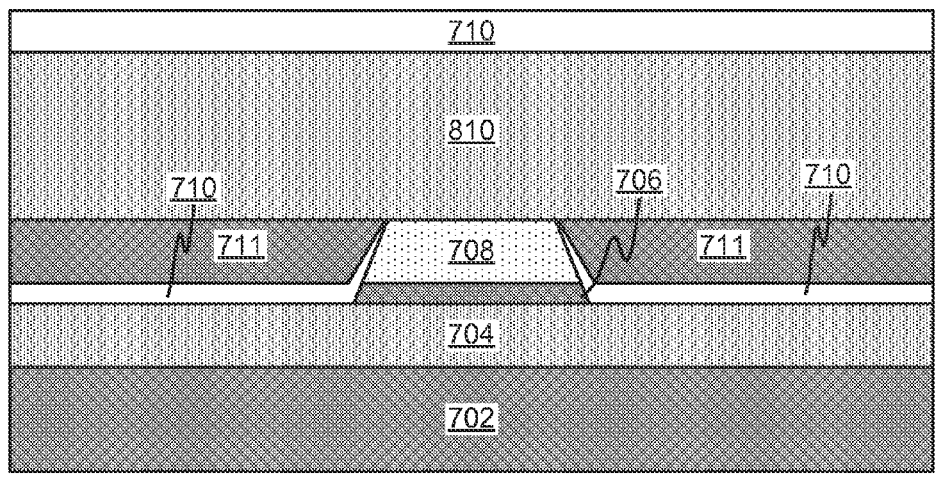
Media-Facing Surface View
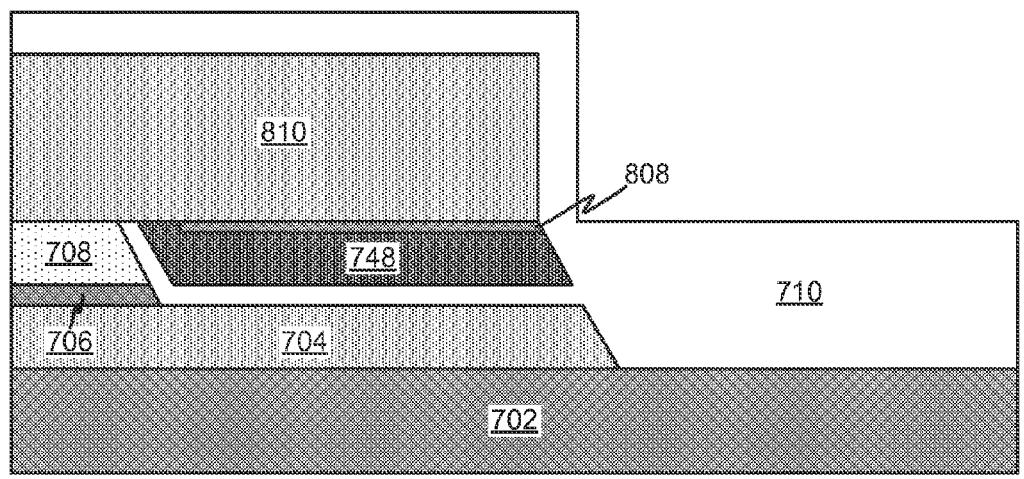
Cross-Sectional View
FIG. 8K

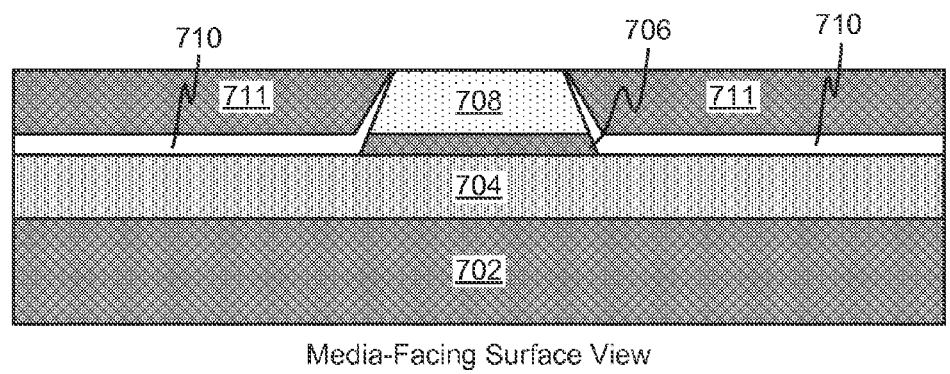
Media-Facing Surface View
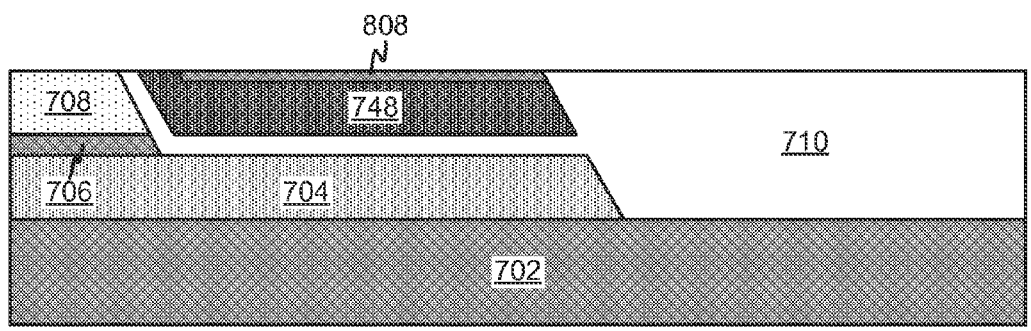
Cross-Sectional View
FIG. 8L

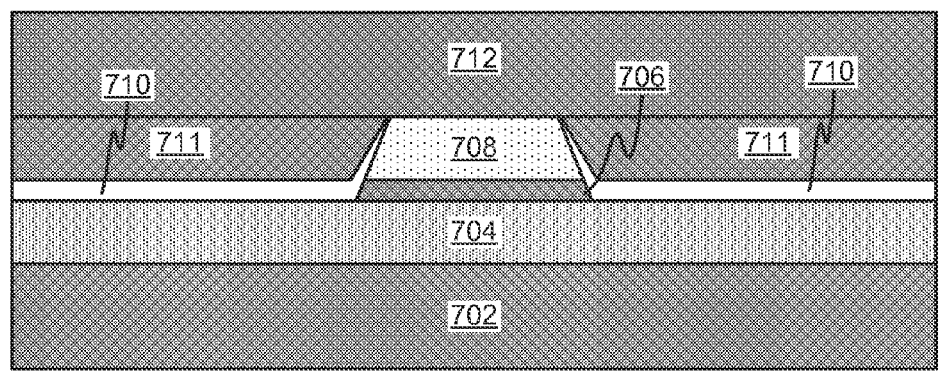
Media-Facing Surface View
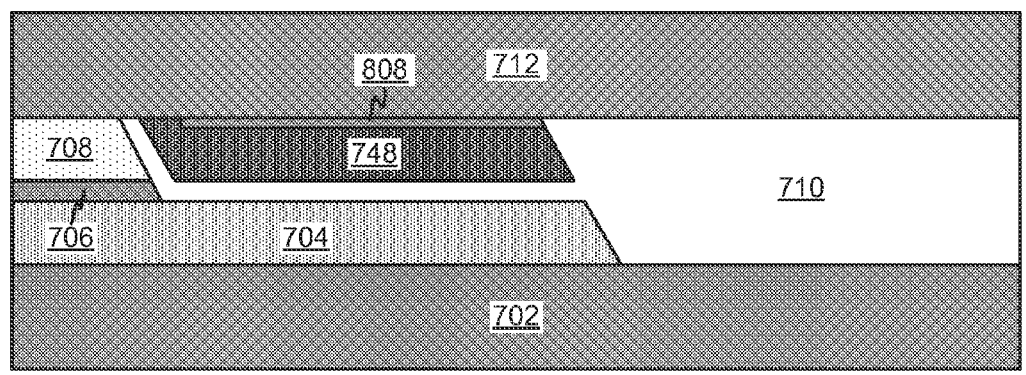
Cross-Sectional View
FIG. 8M

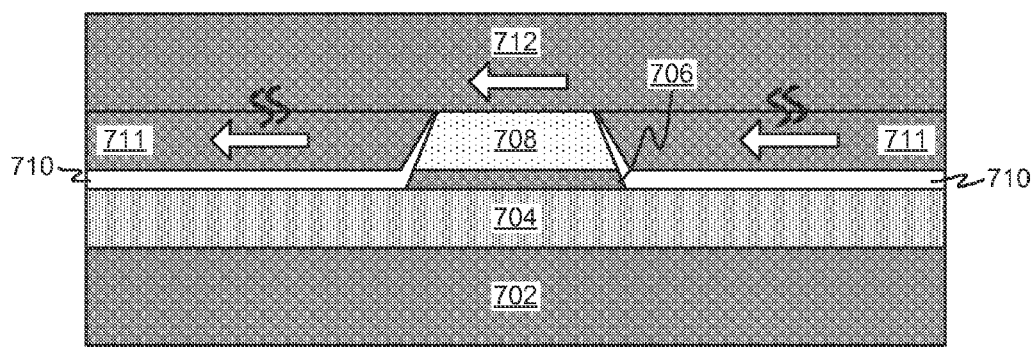
Media-Facing Surface View
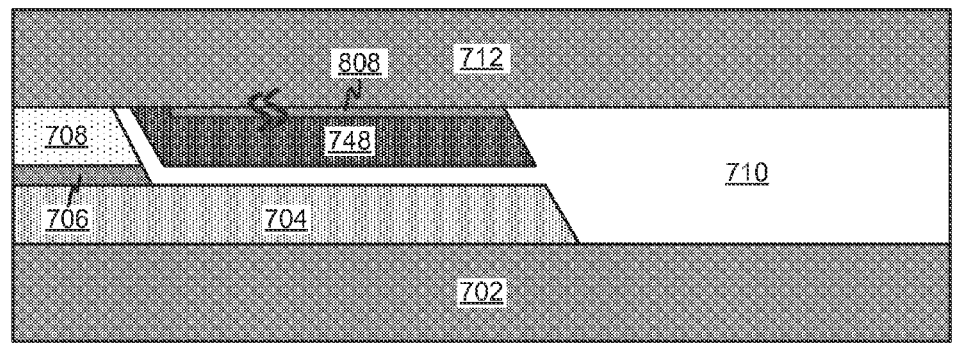
Cross-Sectional View
FIG. 8N

MULTI-SENSOR (MIMO) HEAD HAVING A BACK SIDE ANTIFERROMAGNETIC MIDDLE SHIELD

FIELD OF THE INVENTION

The present invention relates to magnetic heads, and more particularly, this invention relates to a magnetic head having a multi-sensor reader and a back side antiferromagnetic middle shield.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected data tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in limited area and volume. A technical approach to meeting this desire is to increase the capacity by increasing the recording density of the HDD. To achieve higher recording density, further miniaturization of recording bits is effective, which in turn typically requires the design of smaller and smaller components.

Magnetoresistive effect type magnetic heads are employed as sensors for reading magnetic information (data) recorded on a magnetic recording medium (such as a hard disk) in high-density magnetic recording devices (such as HDDs). The use of magnetic read heads that utilize a magnetoresistive effect has become commonplace. One such magnetoresistive effect type read head uses a giant magnetoresistive (GMR) effect in a multi-layered film formed by laminating a ferromagnetic metal layer on a non-magnetic intermediate layer. The first kind of GMR heads employed were Current-In-Plane (CPP)-type heads in which electrical signals flow in parallel with the film plane to the sensor membrane. Next, Tunneling Magnetoresistive (TMR)-effect heads and Current-Perpendicular-To-Plane (CPP)-GMR heads, which are considered advantageous from the standpoint of track narrowing, gap narrowing, and increased output, were developed with improved recording density in mind.

While the demand in recent years for even higher density recording has been met by techniques based on narrowing the effective track width of a magnetoresistive sensor, this track width narrowing has resulted in other problems of increased element resistance, increased electrical and magnetic noise, and as a result, lowered sensitivity and difficulties in increasing the sensitivity.

Multi-sensor reader structures designed to accommodate higher density recording have been proposed to alleviate these problems. Multi-sensor readers are advantageous in that they allow for a magnetic head with a large number of sensors of a size greater than a bit size of the medium, and this allows for bit data to be read from the difference in the plurality of signals produced thereby. Because the sensor size may be increased beyond a single bit size, noise may be suppressed and sensitivity may be increased. However, multi-sensor readers that have staggered or offset sensors that are positioned above or below other sensors encounter a unique problem when reading data on the inside or outside tracks of a HDD.

When reading data from a target track using a three sensor reader structure, with a lower sensor positioned below and between two upper sensors, the lower sensor will be positioned on the target track, with the two upper sensors positioned across the target track and neighboring tracks. This is sometimes referred to as a multiple input multiple output (MIMO) configuration. Each sensor reads multiple signals from the target track and neighboring tracks at the same time, then only target track signal information is extracted using a signal-processing algorithm. This allows for sensors that are wider than a track width to be used, while still keeping a high read sensitivity.

When reading data from outer tracks (OD) or inner tracks (ID) of a magnetic disk, the magnetic head having the multi-sensor reader structure is rotated by a skew angle, which causes at least one of the upper sensors to be shifted to an adjacent track, thereby introducing error into the data signal read from the magnetic disk. In the case of a conventional MIMO head, when the lower sensor is aligned to the target track, a distance between the lower sensor and the upper sensors causes one of the upper sensors to depart from the target track because of the skew angle.

SUMMARY

According to one embodiment, a magnetic head includes a lower magnetic shield positioned at a media facing surface of the head, a lower sensor positioned above the lower magnetic shield, the lower sensor including a lower free layer, a middle magnetic shield positioned above the lower sensor at the media facing surface of the head, and a back side antiferromagnetic (AFM) layer positioned behind the lower free layer in an element height direction.

In another embodiment, a method for forming a magnetic head includes forming a lower magnetic shield at a media facing surface, forming a lower sensor above the lower magnetic shield at the media facing surface, the lower sensor including a lower free layer, forming a back side AFM layer behind the lower free layer in an element height direction, and forming a middle magnetic shield above the lower sensor at the media facing surface of the head, wherein the back side AFM layer is configured to provide magnetic stabilization for the middle magnetic shield.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

FIGS. 8A-8N show various structures formed in a method for manufacturing a MIMO head according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

According to one general embodiment, a magnetic head includes a lower magnetic shield positioned at a media facing surface of the head, a lower sensor positioned above the lower magnetic shield, the lower sensor including a lower free layer, a middle magnetic shield positioned above the lower sensor at the media facing surface of the head, and a back side antiferromagnetic (AFM) layer positioned behind the lower free layer in an element height direction.

In another general embodiment, a method for forming a magnetic head includes forming a lower magnetic shield at a media facing surface, forming a lower sensor above the lower magnetic shield at the media facing surface, the lower sensor including a lower free layer, forming a back side AFM layer behind the lower free layer in an element height direction, and forming a middle magnetic shield above the lower sensor at the media facing surface of the head, wherein the back side AFM layer is configured to provide magnetic stabilization for the middle magnetic shield.

Figure 1:
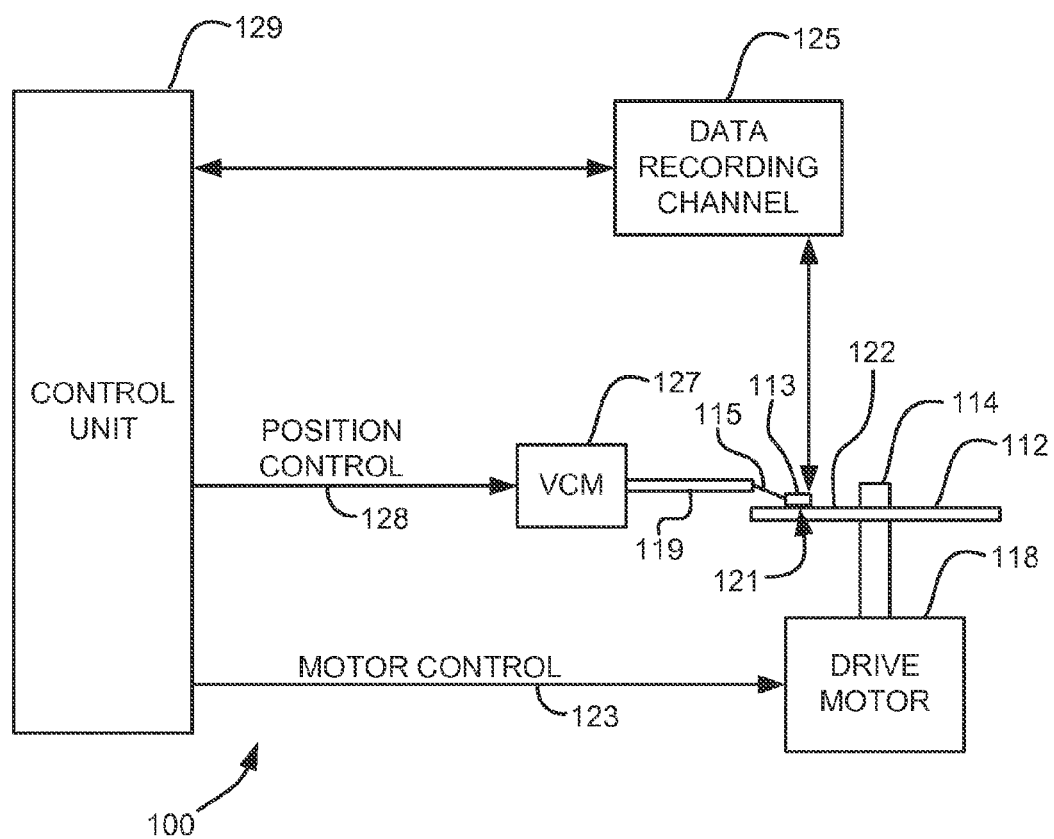
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 are for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap may be formed between the first and second pole piece layers of the write portion by a gap layer at or near a media facing side of the head (sometimes referred to as an ABS in a disk drive). The pole piece layers may be connected at a back gap. Currents are conducted through the coil layer, which produce magnetic fields in the pole pieces. The magnetic fields fringe across the gap at the media facing side for the purpose of writing bits of magnetic field information in tracks on moving media, such as in circular tracks on a rotating magnetic disk.

The second pole piece layer has a pole tip portion which extends from the media facing side to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as aluminum or glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the media facing side 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the media facing side 318. The media facing side 318 is indicated across the right side of the structure.

Perpendicular writing is achieved by forcing flux through the stitch pole 308 into the main pole 306 and then to the surface of the disk positioned towards the media facing side 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the media facing side 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the media facing side 418). The media facing side 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown away from the media facing side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Except as otherwise described herein, the various components of the structures of FIGS. 3A-4B may be of conventional materials and design, as would be understood by one skilled in the art.

Figure 5:
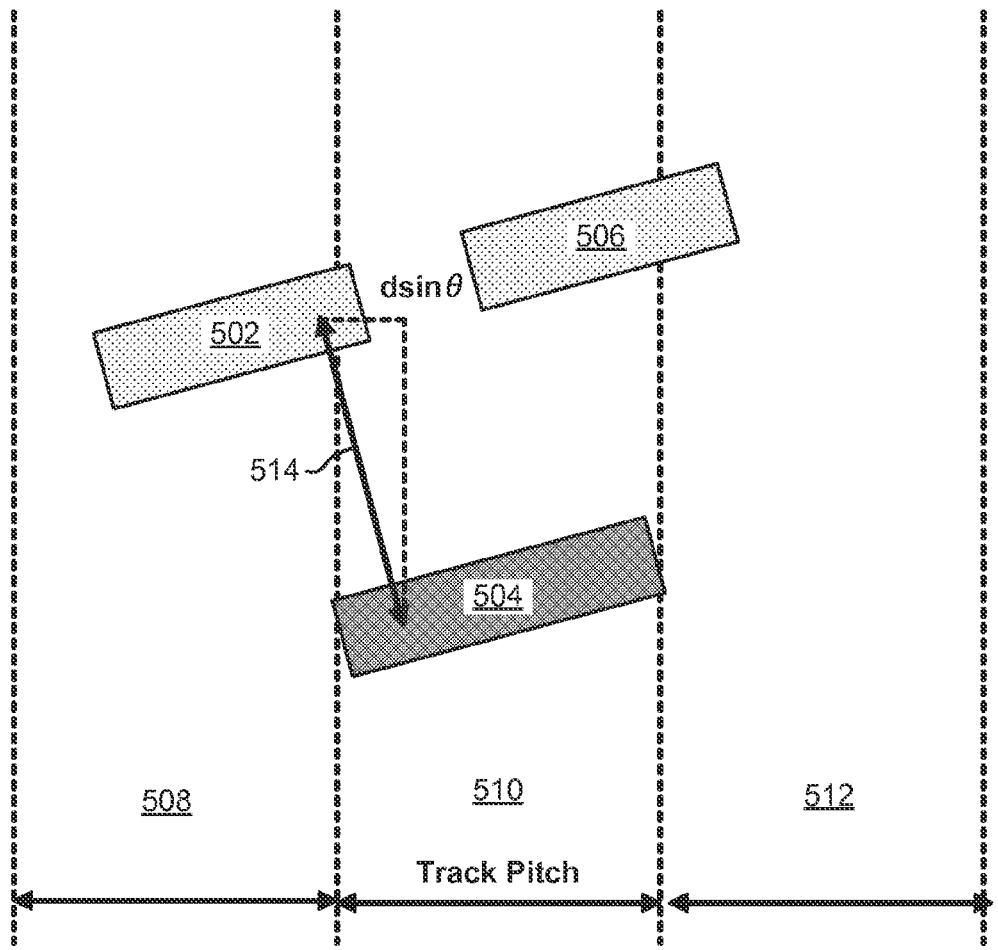
FIG. 5 shows a multi-sensor (MIMO) head showing the effects of skew in one embodiment.

Referring to FIG. 5, a multi-sensor reader structure, referred to as a multiple input multiple output (MIMO) head in some descriptions, is shown at a skew angle of about −15° relative to vertical, which is encountered when reading data from the inner diameter of a HDD. As can be seen, the lower sensor 504 is positioned properly aligned to the target track 510, one of the upper sensors 502 is properly aligned to the first track 508, while the other upper sensor 506 is improperly aligned to the target track 510. The upper sensor 506 should be aligned to the third track 512 in order to provide the information used in the signal-processing algorithm to extract track data from the target track 510. This condition is exacerbated when the distance 514 between the lower sensor 504 and the upper sensors 502, 506 is longer.

Figure 6:
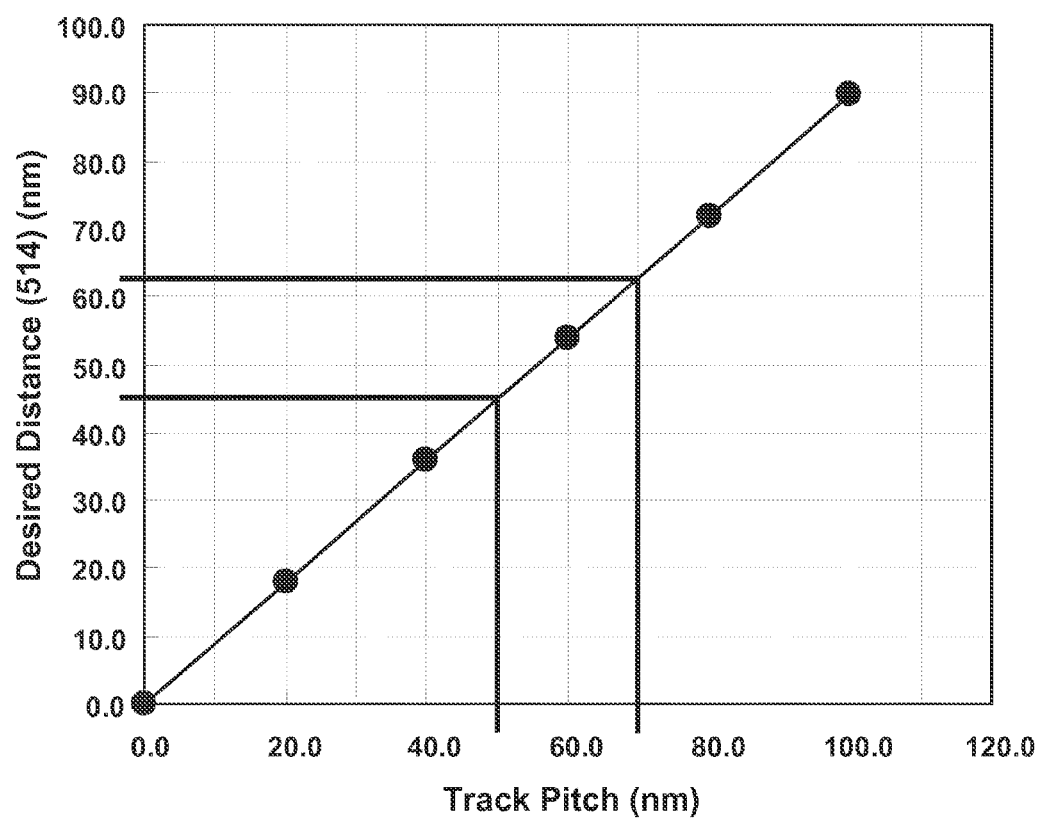
FIG. 6 shows a chart of the distance between the lower and upper sensors versus track pitch.

A chart of the distance 514 between the lower and upper sensors versus track pitch is shown in FIG. 6. As can be seen from this chart and with reference to FIG. 5, in order for the upper sensor 506 to be located on its target track (the third track 512) to allow the MIMO head to operate correctly, the track pitch is taken into account, along with the distance 514 between the lower sensor 504 and the upper sensors 502, 506. In the case of a track pitch of 70 nm (which occurs in conventional HDDs), the distance 514 between the lower sensor 504 and the upper sensors 502, 506 is limited to 63 nm or less. In the case of a track pitch of 50 nm (for higher areal density HDDs), the distance 514 between the lower sensor 504 and the upper sensors 502, 506 is limited to 45 nm or less.

Furthermore, in these calculations, any variation of element positions which arises in the normal fabrication process is not taken into consideration. When the variation is taken into consideration, the distance 514 between the lower sensor 504 and the upper sensors 502, 506 is further limited to even smaller values.

Read sensors require shield layers above (upper shield) and below (lower shield) the sensors because resolution, along with bit direction, becomes high. MIMO heads also utilize upper/middle/lower shields. Recent read sensors have utilized laminated magnetic layers as an upper shield in order to provide a bias field to the sensor through the side shield layer, which is placed on sides of the sensor, and procure higher stability of the upper shield. However, a laminated shield is very thick (around 70 nm) in comparison to a solid shield, because it includes an antiferromagnetic layer (which may comprise MnIr, MnPt, etc.) and a soft magnetic layer (which may comprise NiFe, CoFe, etc.). Therefore, to include a conventional laminated shield structure in a MIMO head as a middle shield would cause an impermissibly large distance (about 74 nm in some cases) between the lower and upper sensors of a MIMO head. However, by not using a laminated shield structure, and instead using a single middle shield of about 20 nm in thickness, the bias field to the lower sensor is not attainable because the magnetic domain of the middle shield material (e.g., NiFe) and the side shield material (e.g., NiFe) are not controlled by an antiferromagnetic (AFM) material (e.g., IrMn).

Figure 7A:
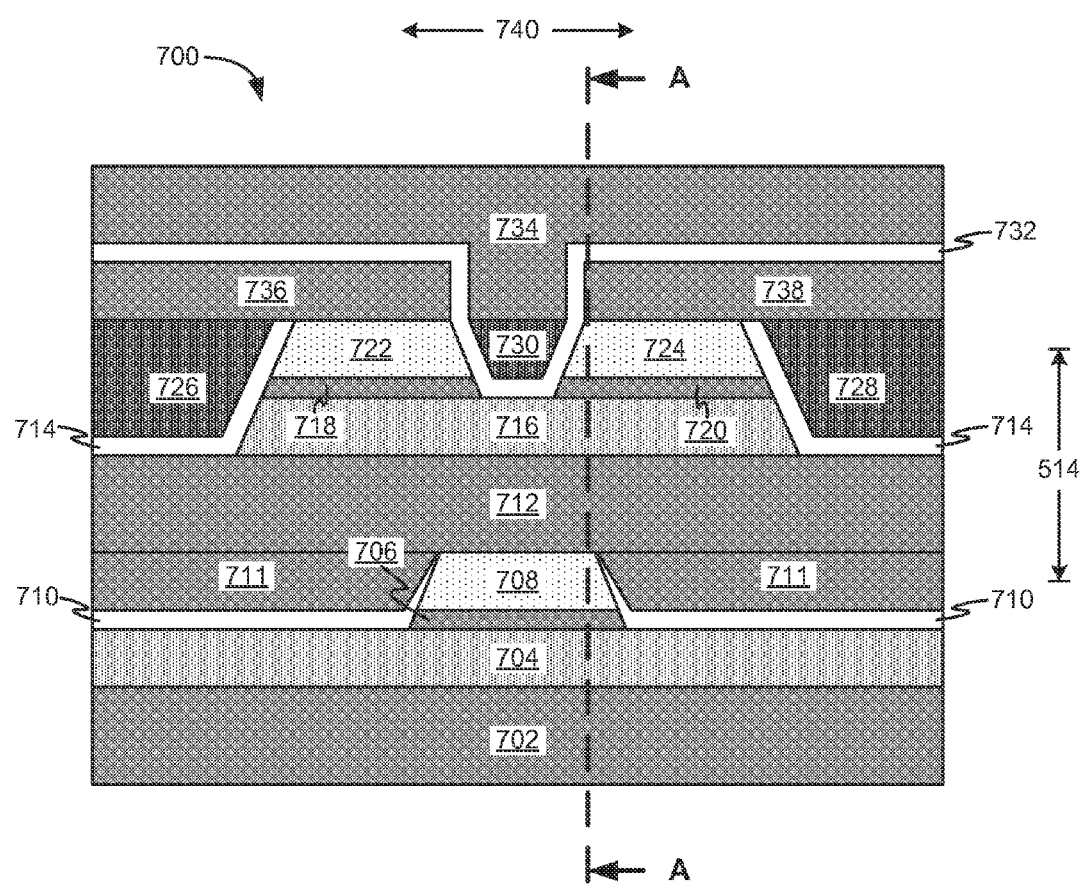
FIG. 7A shows a portion of MIMO head from a media facing surface, according to one embodiment.
Figure 7B:
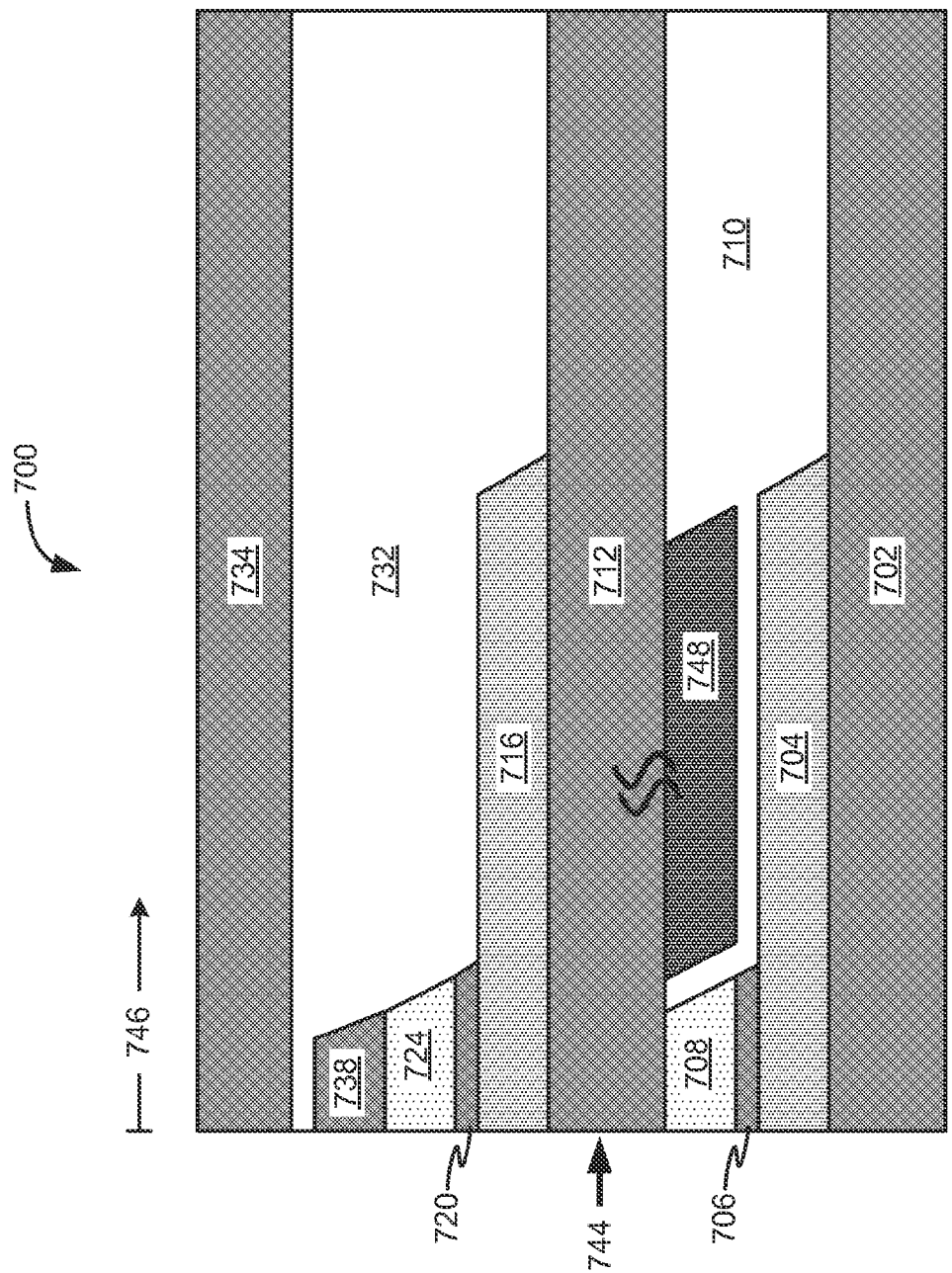
FIG. 7B shows a cross-sectional side view of a portion of the MIMO head according to one embodiment.

In order to provide all the advantages of a multiple sensor MIMO head with a short distance between the lower and upper sensors and a laminated shield structure, an improved laminated shield using an AFM layer is provided, as shown in FIGS. 7A-7B according to one embodiment.

FIG. 7A shows a portion of MIMO head 700 from a media facing surface, while FIG. 7B shows a cross-sectional side view of a portion of the MIMO head 700 taken from Line A-A in FIG. 7A. The lower portion of the MIMO head 700 comprises, in one embodiment, a lower magnetic shield 702, a pinned layer 704 positioned above the lower magnetic shield 702, a lower free layer 708 positioned above the pinned layer 704 that is separated from the pinned layer 704 by a spacer layer 706, insulating layers 710 formed above the pinned layer 704 and on sides of the lower free layer 708 in the cross-track direction 740, and a middle magnetic shield 712 positioned above the lower free layer 708 in the cross-track direction 740. The combination of the pinned layer 704, spacer layer 706, and lower free layer 708 form a lower sensor, as would be understood by one of skill in the art. In addition, a side shield 711 may be positioned on sides of the lower free layer 708 in the cross-track direction 740, the side shield 711 having magnetic anisotropy provided by an AFM layer through the middle magnetic shield 712.

The upper portion of the MIMO head 700 comprises, in one embodiment, a pinned layer 716, two upper free layers 722, 724 positioned above the pinned layer 716 and separated therefrom by two spacer layers 718, 720. Positioned on sides of the pinned layer 716, spacer layers 718, 720, and upper free layers 722, 724 are insulating layers 714. Positioned on sides of the insulating layers 714 in the cross-track direction 740 are bias layers 726, 728, 730. The bias layers 726, 728, 730 may provide hard bias, soft bias, or some combination thereof, such as from a laminated structure having some combination of hard and soft bias layers therein. Two upper leads 736, 738 are positioned above the bias layers 726, 728, and the upper free layers 722, 724. Another insulating layer 732 is positioned above the upper leads 736, 738, below the bias layer 730, between the upper free layers 722, 724, and the bias layer 730, and between the bias layer 730 and the pinned layer 716. Above the insulating layer 732 is positioned an upper magnetic shield 734.

The combination of the pinned layer 716, spacer layer 718, and upper free layer 722 form a first upper sensor, as would be understood by one of skill in the art. Also, the combination of the pinned layer 716, spacer layer 720, and upper free layer 724 form a second upper sensor, as would be understood by one of skill in the art.

Referring to FIG. 7B, positioned behind the lower free layer 708 in the element height direction 746 is an AFM layer 748. This AFM layer 748 is configured to provide stabilization for the middle magnetic shield 712 and bias field to the free layer 708 of the lower sensor through the side shield 711 while maintaining a slim profile for the MIMO head 700 by not being positioned at the media facing surface 744 of the MIMO head 700.

Although not shown in FIG. 7B due to the position of Line A-A in FIG. 7A, a similar upper structure is present behind the other upper free layer 722, accounting for the different elements which exist near the other upper free layer 722 as opposed to the upper free layer 724 shown in FIG. 7B.

The AFM layer 748 may have about the same width or a greater width in the cross-track direction 740 as any portion of the lower free layer 708, in various embodiments.

In another embodiment, the AFM layer 748 may have a same or greater thickness in a track direction (perpendicular to the cross-track direction 740 and along the media facing surface 744) as any portion of the lower free layer 708. In an alternate embodiment, the AFM layer 748 may have a thickness in the track direction that is less than any portion of the lower free layer 708.

The lower free layer 708 and upper free layers 722, 724 may have a length in the element height direction 746 of about 30 nm, or more, or less, depending on a desired performance and stabilization of the lower sensor and upper sensor.

The various layers described in the MIMO head 700 may comprise any suitable materials known in the art. In one exemplary embodiment, the lower magnetic shield 702, side shield 711, middle magnetic shield 712, and upper magnetic shield 734 may each comprise one or more of Ni, Co, Fe, and combinations thereof, such as NiFe, CoFe, etc.

In another exemplary embodiment, the free layers 708, 722, 724 may each comprise a ferromagnetic material, such as one or more of Co, Fe, Ni, B, and combinations thereof, such as CoFe, NiFe, CoFeB, etc., that may include one or more additional materials not specifically described herein, as understood by one of skill in the art.

In yet another exemplary embodiment, the AFM layer 748 may comprise Mn and one or more of Ir, Pt, Fe, and combinations thereof, such as IrMn, PtMn, FeMn, etc., that may include one or more additional materials not specifically described herein, as understood by one of skill in the art.

According to another exemplary embodiment, the insulating layers 710, 714, 732 may comprise any electrically insulating (and non-magnetic) material known in the art, such as alumina, MgO, $Si_3N_4$, $Ta_2O_5$, etc., and combinations thereof.

In another exemplary embodiment, the upper leads 736, 738 may each comprise non-magnetic materials such as Cr, Au, Ir, etc., and in another exemplary embodiment, the upper leads 736, 738 may each comprise magnetic materials such as one or more of Ni, Co, Fe, and combinations thereof, such as NiFe, CoFe, etc., that may include one or more additional materials not specifically described herein, as understood by one of skill in the art.

Furthermore, although not specifically shown in FIGS. 7A-7B, a cap layer may be positioned above the free layers 708, 722, 724, which may comprise any suitable material known in the art, such as Ru, Ta, etc.

According to another embodiment, the pinned layers 704, 716, may comprise a solid material of a type known in the art, or a laminated structure (not shown) having a seed layer, an AFM layer positioned above the seed layer, and a magnetic layer positioned above the AFM layer. Any suitable materials known in the art may be used for each of the various layers of the pinned layers 704, 716.

In another embodiment, when using a TMR sensor, the spacer layer (such as any spacer layer 706, 718, 720) may comprise a tunneling layer material, such as MgO and other materials known in the art. When using a GMR sensor, the spacer layer (such as any spacer layer 706, 718, 720) may comprise a conductive layer material, such as Cu, Ag, Au, AgSn, etc., and other materials known in the art.

On aspect of the MIMO head 700 that is of particular interest is that the AFM layer 748 is embedded at a back side of the lower free layer 708 in the element height direction 746. Due to this structure, the distance 514 between the lower sensor and either of the upper sensors may be reduced from greater than about 70 nm in a conventional MIMO head with a laminated shield structure used as a middle magnetic shield, to about 44 nm or less, while keeping magnetic domain control of the middle magnetic shield 712 (as indicated by the wavy lines between the middle magnetic shield 712 and the AFM layer 748) and providing bias field to the free layer 708 of the lower sensor through the side shield 711.

This reduced height profile is possible due to the AFM layer 748 not being exposed to the media facing surface 744 of the MIMO head 700. As a result, a track pitch of less than about 50 nm is attainable. Furthermore, this small track pitch allows for magnetic media having a high areal density of over about 1.1 TB per square inch.

In some approaches, a MIMO head 700 as shown in FIGS. 7A-7B may be used in a magnetic data storage system. The magnetic data storage system may be similar to that shown in FIG. 1. For example, the magnetic data storage system 100 may comprise at least one MIMO head 121 as described according to any embodiment herein, a magnetic medium 112, a drive mechanism 118 for passing the magnetic medium 112 over the at least one MIMO head 121, and a controller 129 electrically coupled to the at least one MIMO head 121 for controlling operation of the at least one MIMO head 121.

With reference to FIGS. 8A-8N, a method for manufacturing a lower sensor and middle magnetic shield of a MIMO head is shown in various states of formation according to one embodiment. Each step in the manufacturing method will be described with reference to one or more figures, each figure including a view from the media facing surface of the MIMO head in the upper figure, and a cross-sectional side view of the MIMO head in the lower figure.

In FIG. 8A, a lower magnetic shield 702, which may comprise NiFe, CoFe, or some other suitable material known in the art, is formed using any formation technique known in the art, such as plating, sputtering, etc. The lower magnetic shield 702 may be provided by way of a film of $Al_2O_3$, SiN, TaOx, MgO, etc., on an $Al_2O_3$—TiC wafer serving as a base body of a slider (not shown in the figures).

Then, a sputtering method, for example, or some other suitable formation technique, may be employed to deposit a pinned layer 704 above the lower magnetic shield 702, the pinned layer 704 comprising any suitable material known in the art. Above the pinned layer 704, a lower free layer 708 is formed using any formation technique known in the art. The lower free layer 708 may comprise any suitable material known in the art, such as CoFe, NiFe, CoFeB, etc. Between the lower free layer 708 and the pinned layer 704, a spacer layer 706 is formed using any formation technique known in the art. The spacer layer 706 may comprise any suitable material known in the art, such as MgO for a TMR sensor, Cu, Ag, Au, etc., for a GMR sensor, etc.

In FIG. 8B, a mask pattern 804 for track width shape formation is formed above portions of the lower free layer 708 that will become the lower free layer 708 of the lower sensor near the media facing surface. Any suitable material known in the art may be used for the mask material, such as photoresist, hard mask material, $Al_2O_3$, $SiO_2$, diamond like carbon (DLC), other dielectric materials, etc. Furthermore, the mask pattern may be formed using a photolithography process and/or reactive ion etching (RIE), Ar ion milling, etc.

The track width shape formation of the lower sensor is shown in FIG. 8B, and may be accomplished using a full-mill process (removing portions of the lower free layer 708, the spacer layer 706, and the pinned layer 704), which is not shown, or a partial-mill process (removing portions of the lower free layer 708 and the spacer layer 706) as shown in FIGS. 8B-8C. Furthermore, the track width of the lower sensor may be formed using Ar ion milling and/or RIE to define the track width of the lower free layer 708.

The width of the mask pattern 804 may be from about 20 nm to about 100 nm, or more, in various approaches, depending on the desired track width of the lower sensor.

Next, as shown in FIG. 8C, the result of a partial mill of the track width formation is shown. In other embodiments, a full-mill process may be used, which is not shown. As shown in FIG. 8C, the track width of the lower free layer 708 and spacer layer 706 is shown, which is effected by the width of mask pattern 804 used. The outer track definition takes place by etching or otherwise removing outer portions of the lower free layer 708 and the spacer layer 706 down to the upper surface of the pinned layer 704, known as a partial-mill process.

Then, as shown in FIG. 8D, an insulating layer 710 is formed above the lower free layer 708 and in the cross-track direction therefrom, using a sputtering method or some other suitable formation technique. Above the insulating layer 710, a lower side shield 711 is formed in the cross-track direction. A seed layer (not shown) may be formed before the lower side shield 711 to aid in adhesion and growth of the lower side shield 711, and may comprise Ta/Ru or some other suitable material known in the art.

The insulating layer 710 may comprise any suitable material known in the art, such as $Al_2O_3$, MgO, $Si_3N_4$, $Ta_2O_5$, etc. The insulating layer 710 defines the current pass in the cross-track direction. The lower side shield 711 may comprise NiFe, CoFe, and/or some other suitable material, and may further be used in a single layer or a laminated structure as known in the art.

In FIG. 8E, a removal process is shown that removes the mask pattern 804, portions of the insulating layer 710 above the lower free layer 708 and portions of the lower side shield 711 above the lower free layer 708. Any suitable removal process may be used, such as lift-off, planarization, CMP, etc. In one embodiment, a lift-off process is carried out, such as via dip with an ultrasonic wave tool. CMP may be added to assist with the lift-off and planarization, in some approaches. This ends the track shape formation of the lower sensor.

In FIGS. 8F-8I, stripe height shape formation is shown according to one embodiment. As shown, a mask pattern 806 for the stripe height shape formation is formed above portions of the lower free layer 708. Any suitable material known in the art may be used for the mask material, such as photo-resist, hard mask material, $Al_2O_3$, $SiO_2$, DLC, other dielectric materials, etc. Then, the result of a partial mill of the stripe height is shown. In other embodiments, a full-mill process may be used, which is not shown.

As shown in FIG. 8G, the formation of the stripe height shape of the lower free layer 708 and spacer layer 706 is shown. The stripe height shape is formed by etching or otherwise removing back portions of the lower free layer 708 and the spacer layer 706 down to the upper surface of the pinned layer 704, known as a partial-mill process.

Then, as shown in FIG. 8H, an insulating layer 710 is formed above and behind the lower free layer 708 and the spacer layer 706. Above the insulating layer 710, an AFM layer 748 is formed using any formation process known in the art. The AFM layer 748 may comprise IrMn, PrMn, and/or some other suitable materials known in the art.

The insulating layer 710 positioned behind the lower free layer 708 in the element height direction defines the current pass in the element height direction. The insulating layer 710 may comprise any suitable material known in the art, such as $Al_2O_3$, MgO, $Si_3N_4$, $Ta_2O_5$, etc.

A seed layer (not shown) may be formed above the insulating layer 710 prior to formation of the AFM layer 748 to maintain magnetic properties of the AFM layer 748. After formation of the AFM layer 748, a cap layer 808 may be formed using any suitable formation process known in the art. The cap layer 808 may be used for better adhesion of subsequently formed layers and/or for protection of the AFM layer 748 during a later removal process, such as CMP, etc. Furthermore, the cap layer 808 may comprise any suitable magnetic material known in the art, such as NiFe, CoFe, etc.

As shown in FIG. 8I, a lift-off process is used to remove portions of the AFM layer 748, the cap layer 808, and the insulating layer 710 positioned above and behind the lower free layer 708 in the element height direction. The stripe height (in the element height direction) of the lower free layer 708 may be in a range from about 50 nm to about 150 nm, or more, in certain approaches. This finishes the stripe height definition of the lower sensor. A portion of the AFM layer 748 remains in a position behind the lower free layer 708 in the element height direction, separated therefrom by the insulating layer 710 on a back edge of the lower free layer 708.

Then, as shown in FIG. 8J, another mask pattern 810 is formed above portions of the lower free layer 708, the AFM layer 748, the cap layer 808, and the insulating layer 710. This mask pattern 810 will be used to define a stripe height of the AFM layer 748. That is, the length of the resulting AFM layer 748 in the element height direction is determined by a length of the mask pattern 810 in the element height direction.

In FIG. 8K, an insulating layer 710 is formed above the mask pattern 810, the back edges of the AFM layer 748 and the cap layer 808, and the lower magnetic shield 702. This insulating layer may have the same or different composition as the other insulating layers formed previously, such as $Al_2O_3$, MgO, $Si_3N_4$, $Ta_2O_5$, etc.

Then, as shown in FIG. 8L, a removal and/or lift-off process is shown that removes the mask pattern 810 and portions of the insulating layer 710 above and behind the mask pattern 810. Any suitable removal process may be used, such as lift-off, planarization, CMP, etc. Furthermore, the side shield 711, the insulating layer 710, and the pinned layer 704 are also etched and/or removed in the element height direction at regions away from the lower free layer 708 in the cross-track direction, thereby defining the cross-track profile of the structure.

This forms the lower sensor. A portion of the AFM layer 748 remains in a position behind the lower free layer 708 in the element height direction, separated therefrom by the insulating layer 710 on a back edge of the lower free layer 708. In one embodiment, the AFM layer 748 may have a length in the element height direction in a range from about 100 nm to a few microns, in some approaches, such as about 100 nm, 500 nm, 1.5 micron, etc. In more embodiments, the AFM layer 748 may have a width in the cross-track direction in a range from about 500 nm to a few microns, in some approaches, such as about 500 nm, 1.5 micron, 3 micron, etc.

Next, as shown in FIG. 8M, formation of the middle magnetic shield 712 is shown above the structure, which completes the formation process for the lower sensor of the MIMO head in this embodiment. Prior to formation of the middle magnetic shield 712, the structure may be cleaned by Ar ion milling or some other suitable etching technique to ensure good adhesion for the middle magnetic shield 712. The middle magnetic shield 712 may be formed of the same or different material than the side shield 711, such as NiFe, CoFe, and/or some other suitable material, and may further be used in a single layer or a laminated structure.

After formation of the middle magnetic shield 712, an annealing process may be performed to provide a high exchange field between the AFM layer 748 and the middle magnetic shield 712, as shown in FIG. 8N, where the timing is determined based on sensor properties and performance, and may be applied just after middle magnetic shield 712 deposition, and/or after upper sensor formation. Magnetic coupling between the AFM layer 748 and the middle magnetic shield 712 is induced, as indicated by the curved double lines between these layers in FIG. 8N. The middle magnetic shield 712 and the side shield 711 are ferromagnetically coupled because they are in direct contact, as indicated by the curved double lines therebetween in FIG. 8N. Furthermore, the side shield 711 has magnetic anisotropy by the AFM layer 748 through the middle magnetic shield 712. As a result, a bias field is provided to the lower free layer 708 by the side shield 711 and the middle magnetic shield 712. The middle magnetic shield 712 also has a higher stability because of its own anisotropy.

Any suitable formation techniques known in the art may be used to form the various layers and shapes described in FIGS. 8A-8N, including but not limited to, mask patterning, double patterning, ArF exposure, ArF liquid immersion, extreme ultraviolet lithography (EUV), Ar ion milling, reactive ion etching (RIE), sputtering, long throw sputtering (LTS), lift-off, chemical mechanical polishing (CMP), and others not specifically described herein that are known in the art.

The method described in FIGS. 8A-8N is representative of the formation of one embodiment of a lower sensor and a middle magnetic shield of a MIMO head.

Figure 9A:
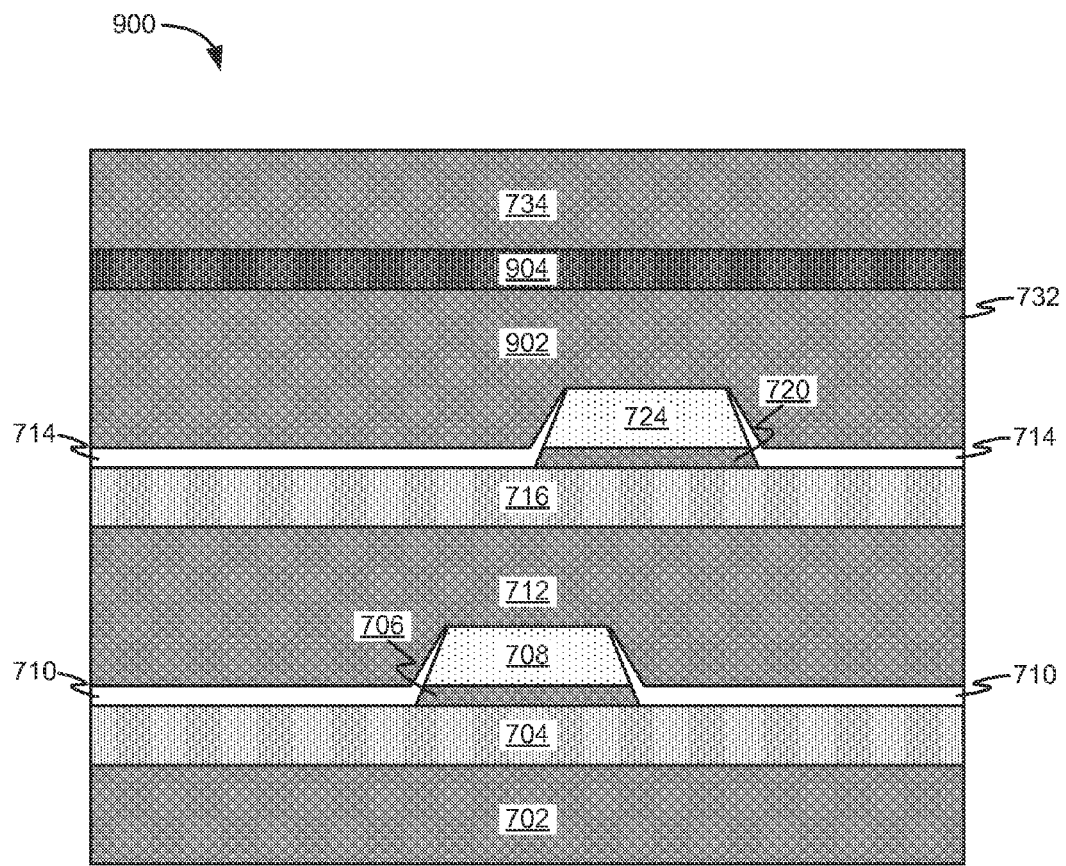
FIGS. 9A-9C show several embodiments of MIMO heads seen from a media facing surface.
Figure 9B:
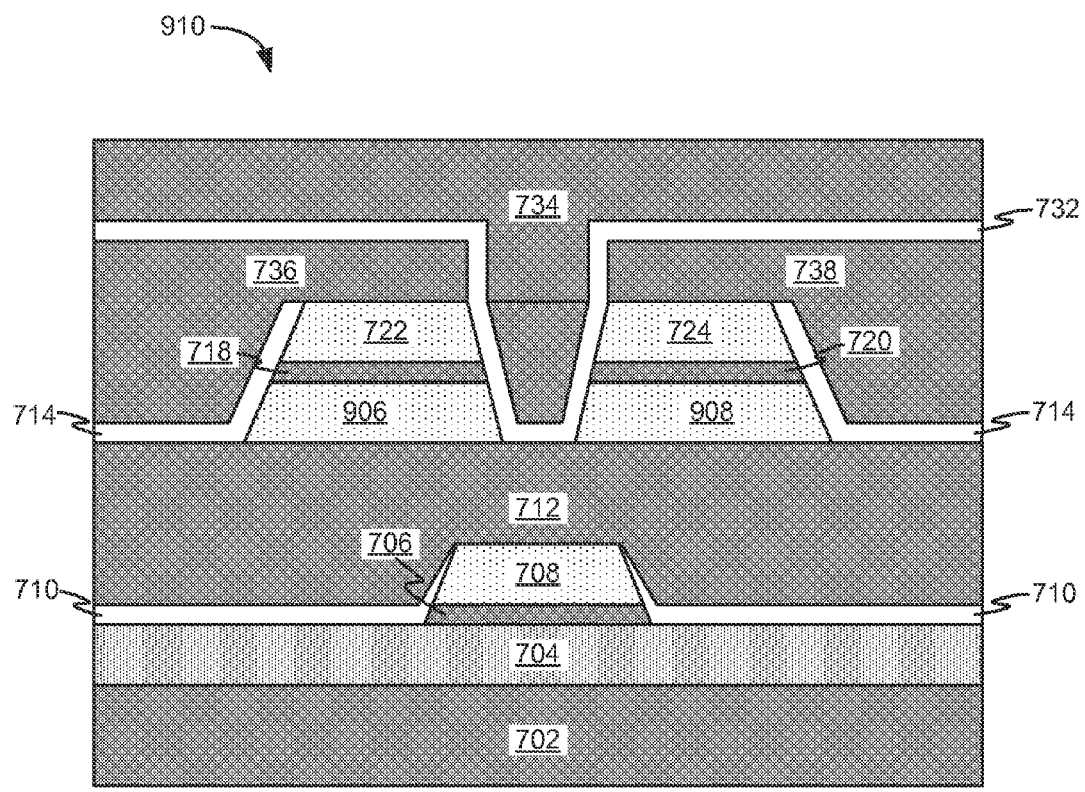
Figure 9C:
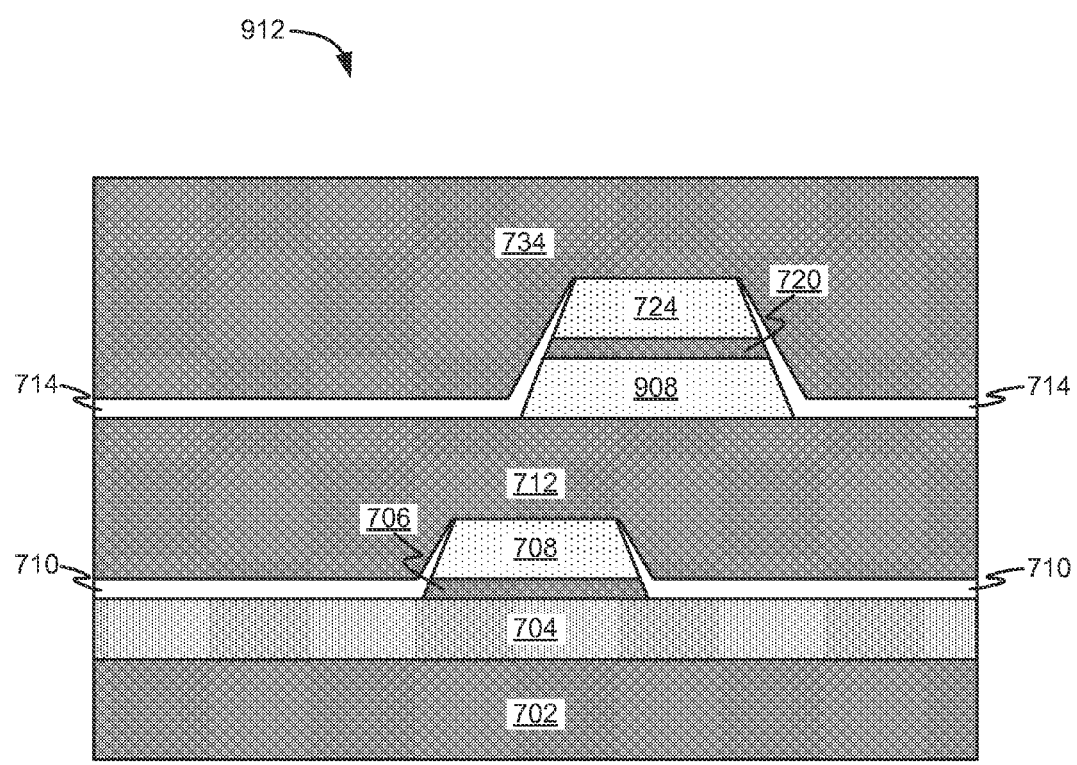

Now referring to FIGS. 9A-9C, other MIMO heads 900, 910, 912 are shown which may be used in conjunction with the back side AFM middle shield, described in the context of FIGS. 7A-7B according to various embodiments. All the reference numbers used in FIGS. 7A-7B relate to the same layers in FIGS. 9A-9C. In FIG. 9A, a two sensor MIMO head 900 is shown with conventional sensors which utilize a spacer layer 706, 720 in each sensor, along with pinned layer 704, 716. As shown, another AFM layer 904 may be positioned into the upper magnetic shield 734, with a magnetic layer 902 disposed therebetween. Furthermore, above the lower sensor, a middle magnetic shield 712 is positioned having a back side AFM layer therein.

As shown in FIG. 9B, a three sensor MIMO head 910 is shown according to one embodiment. This MIMO head 910 includes a lower conventional sensor having a pinned layer 704, a spacer layer 706, and a lower free layer 708, a middle magnetic shield 712 having a back side AFM layer therein, and two upper dual-free sensors comprising first free layers 906, 908, spacer layers 718, 720, and upper free layers 722, 724, respectively. The first free layers 906, 908 of upper sensors may couple with middle magnetic shield 712 to determine the initial magnetic direction of the first free layers 906, 908 for correct behavior of upper dual-free sensors. In this arrangement, the distance between the upper and lower sensor may be reduced to about 36 nm.

As shown in FIG. 9C, a two sensor MIMO head 912 is shown according to one embodiment. This MIMO head 912 includes a lower conventional sensor having a pinned layer 704, a spacer layer 706, and a lower free layer 708, a middle magnetic shield 712 having a back side AFM layer therein, and a single upper dual-free sensor comprising a first free layer 908, a spacer layer 720, and an upper free layer 724. The upper sensor is positioned below an upper magnetic shield 734. In this arrangement, the distance between the upper and lower sensor may also be reduced to about 36 nm.

Figure 10:
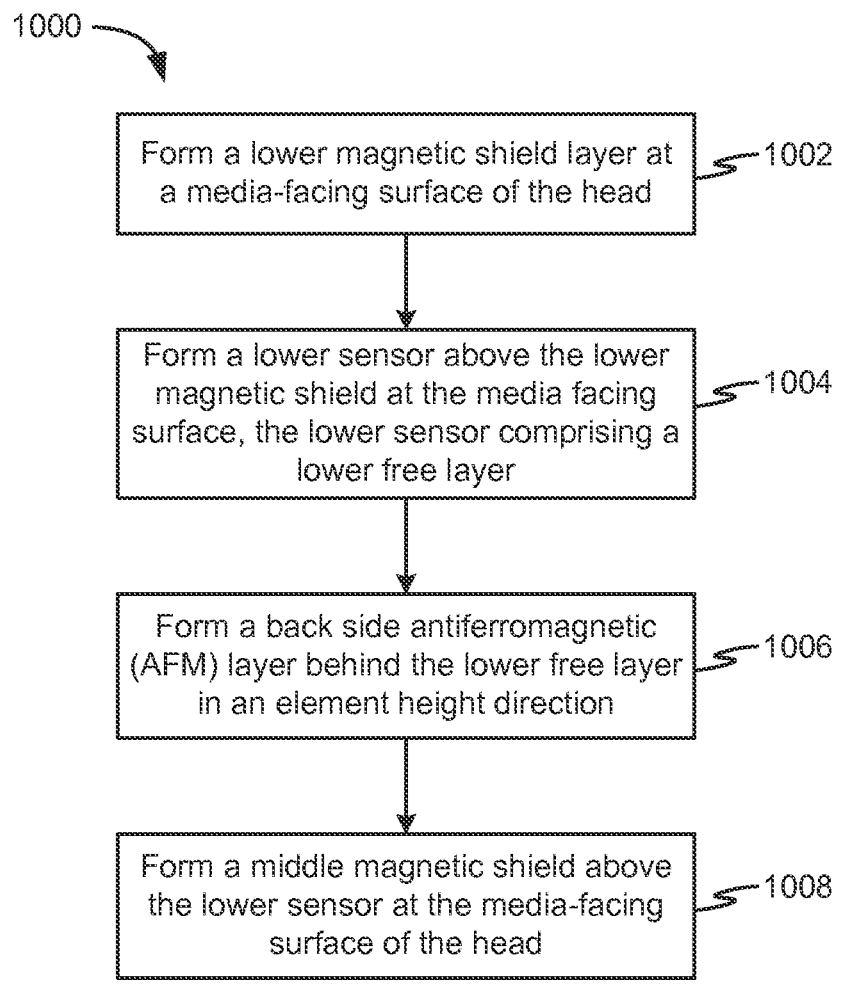
FIG. 10 shows a flowchart of a method according to one embodiment.

In FIG. 10, a method 1000 for forming a MIMO head is shown according to one embodiment. The method 1000 may be implemented in any desired environment, including but not limited to those depicted in FIGS. 1-9C, among others.

In operation 1002, a lower magnetic shield layer is formed at a media facing surface of the head. Any suitable material and formation technique known in the art may be used to form the lower magnetic shield layer.

In operation 1004, a lower sensor is formed above the lower magnetic shield at a media facing surface, the lower sensor comprising a lower free layer. Any suitable formation technique(s) and material(s) known to those of skill in the art may be used to form the lower sensor.

The formation of the lower sensor may comprise forming a pinned layer above the lower magnetic shield at the media facing surface of the head, forming a spacer layer above the pinned layer, and forming the lower free layer above the spacer layer. Any suitable material and formation techniques known in the art may be used to form the various layers.

In an alternate embodiment, formation of the lower sensor may comprise forming a first free layer above the lower magnetic shield at the media facing surface of the head, forming a spacer layer above the first free layer, and forming the lower free layer above the spacer layer. Any suitable material and formation techniques known in the art may be used to form the various layers.

In one embodiment, the pinned layer may extend beyond the back side AFM layer in the element height direction. In another embodiment, the back side AFM layer may have a thickness at least as great as the lower free layer.

In another embodiment, a side shield may be positioned on sides of the lower sensor in the cross-track direction, and may have magnetic anisotropy provided by the AFM layer through the middle magnetic shield according to one embodiment.

In one embodiment, the spacer layer may include MgO when the lower sensor is a TMR sensor. In an alternate embodiment, the spacer layer may include Ag when the lower sensor is a GMR sensor.

In a further embodiment, a mask pattern layer may be used in the formation of the lower sensor, followed by a lift-off process to define a track width and/or stripe height of the lower sensor.

In operation 1006, a back side AFM layer is formed near a back edge of the lower sensor in the element height direction. In other words, the back side AFM layer is formed behind the lower free layer in the element height direction. The back side AFM layer may extend for some predetermined distance in the element height direction, such as about 100 nm, about 500 nm, about 1.5 micron, etc. Also, the thickness of the AFM layer may be from about 3 nm to about 15 nm, such as about 5 nm, about 10 nm, etc., in various embodiments.

In one embodiment, the back side AFM layer may be configured to provide magnetic stabilization for the middle magnetic shield.

In one embodiment, the lift-off process may also be used to define a width of the back side AFM layer in the cross-track direction, and/or other etching techniques known in the art.

In another further embodiment, a cap layer may be formed above the back side AFM layer to protect the back side AFM layer from subsequent processing and/or layer deposition processes.

In operation 1008, a middle magnetic shield is formed above the lower sensor, and the back side AFM layer. Any suitable material(s) and formation technique(s) known in the art may be used to form the middle magnetic shield. In this way, the middle magnetic shield, due to the influence of the back side AFM layer, may act to magnetically stabilize the middle magnetic shield to provide better performance for the lower sensor.

In a further embodiment, the method 1000 may include forming one or more upper sensors at the media facing surface above the middle magnetic shield (and the lower sensor), and offset by a predetermined amount in the cross-track direction from the lower sensor, to form a MIMO head. In a further embodiment, method 1000 may include forming an upper magnetic shield above the at least one upper sensor.

Additional processing may also be performed such as forming a writer above the sensors, forming a protective overcoat on the media facing surface of the sensor(s), etc.

According to one embodiment, a distance between the at least one upper sensor and the lower sensor in a track direction perpendicular to the cross-track direction along the media facing surface of the head may be about 46 nm or less.

It should be noted that methodology presented herein for at least some of the various embodiments may be implemented, in whole or in part, in computer hardware, software, by hand, using specialty equipment, etc., and combinations thereof.

Moreover, any of the structures and/or steps may be implemented using known materials and/or techniques, as would become apparent to one skilled in the art upon reading the present specification.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
    a lower magnetic shield positioned at a media facing surface of the head;
    a lower sensor positioned above the lower magnetic shield, the lower sensor comprising a lower free layer;
    a middle magnetic shield positioned above the lower sensor at the media facing surface of the head; and
    a back side antiferromagnetic (AFM) layer positioned behind the lower free layer in an element height direction and in direct contact with the middle magnetic shield, the back side AFM layer being configured to provide magnetic stabilization for the middle magnetic shield.

2. The magnetic head as recited in claim 1, further comprising a side shield positioned on sides of the lower sensor in a cross-track direction, the side shield having magnetic anisotropy provided by the AFM layer through the middle magnetic shield, the side shield and the middle magnetic shield providing a bias field to the free layer.

3. The magnetic head as recited in claim 1, wherein the lower sensor further comprises:
    a pinned layer positioned above the lower magnetic shield at the media facing surface; and
    a spacer layer positioned above the pinned layer and below the lower free layer.

4. The magnetic head as recited in claim 3, wherein the spacer layer comprises MgO when the lower sensor is a tunneling magnetoresistive (TMR) sensor, and wherein the spacer layer comprises Ag when the lower sensor is a giant magnetoresistive (GMR) sensor.

5. The magnetic head as recited in claim 3, wherein the pinned layer extends beyond the back side AFM layer in the element height direction.

6. The magnetic head as recited in claim 3, wherein the back side AFM layer has a thickness at least as great as the lower free layer.

7. The magnetic head as recited in claim 1, further comprising at least one upper sensor positioned above the lower sensor and offset from the lower sensor in a cross-track direction by less than a width of the lower sensor, wherein a portion of the lower sensor and a portion of each of the at least one upper sensor are aligned in a track direction perpendicular to the cross-track direction.

8. The magnetic head as recited in claim 7, wherein a distance between the at least one upper sensor and the lower sensor in the track direction along the media facing surface of the head is about 46 nm or less.

9. The magnetic head as recited in claim 7, further comprising an upper magnetic shield positioned above the at least one upper sensor.

10. The magnetic head as recited in claim 7, wherein the at least one upper sensor is a dual free sensor comprising two free layers, and wherein the lower sensor is a conventional sensor comprising a pinned layer.

11. The magnetic head as recited in claim 1, wherein the lower sensor comprises:
    a first free layer positioned above the lower magnetic shield at the media facing surface;
    a spacer layer positioned above the first free layer; and
    a second free layer positioned above the spacer layer.

12. The magnetic head as recited in claim 1, wherein no portion of the back side AFM layer is positioned at the media facing surface.

13. A magnetic data storage system, comprising:
    at least one magnetic head as recited in claim 1;
    a magnetic medium;
    a drive mechanism for passing the magnetic medium over the at least one magnetic head; and
    a controller electrically coupled to the at least one magnetic head for controlling operation of the at least one magnetic head.

14. A method for forming a magnetic head as recited in claim 1, the method comprising:
    forming a lower magnetic shield at a media facing surface;
    forming a lower sensor above the lower magnetic shield at the media facing surface, the lower sensor comprising a lower free layer;
    forming a back side antiferromagnetic (AFM) layer behind the lower free layer in an element height direction; and
    forming a middle magnetic shield above the lower sensor at the media facing surface of the head and in direct contact with the back side AFM layer,
    wherein the back side AFM layer is configured to provide magnetic stabilization for the middle magnetic shield.

15. The method as recited in claim 14, wherein forming the lower sensor comprises:
    forming a pinned layer above the lower magnetic shield; and
    forming a spacer layer above the pinned layer and below the lower free layer.

16. The method as recited in claim 15, wherein the spacer layer comprises MgO when the lower sensor is a tunneling magnetoresistive (TMR) sensor, and wherein the spacer layer comprises Ag when the lower sensor is a giant magnetoresistive (GMR) sensor.

17. The method as recited in claim 15, wherein the pinned layer extends beyond the back side AFM layer in the element height direction.

18. The method as recited in claim 14, wherein the back side AFM layer has a thickness at least as great as the lower free layer, and further comprising forming a side shield on sides of the lower sensor in a cross-track direction, the side shield having magnetic anisotropy provided by the AFM layer through the middle magnetic shield, the side shield and the middle magnetic shield providing a bias field to the free layer.

19. The method as recited in claim 14, further comprising:
    forming at least one upper sensor at the media facing surface above the middle magnetic shield and offset from the lower sensor in a cross-track direction; and forming an upper magnetic shield above the at least one upper sensor, wherein a distance between the at least one upper sensor and the lower sensor in a track direction perpendicular to the cross-track direction along the media facing surface of the head is about 46 nm or less.

20. The method as recited in claim 14, wherein forming the lower sensor comprises:

forming a first free layer above the lower magnetic shield at the media facing surface; and forming a spacer layer above the first free layer and below the lower free layer.

\* \* \* \* \*